(12) United States Patent
Wang et al.

(10) Patent No.: US 12,298,624 B2
(45) Date of Patent: May 13, 2025

(54) DISPLAY DEVICE

(71) Applicants: Beijing BOE Display Technology Co., Ltd., Beijing (CN); BOE Technology Group Co., Ltd., Beijing (CN)

(72) Inventors: Boning Wang, Beijing (CN); Hao Wu, Beijing (CN); Jian Ren, Beijing (CN); Xiaoping Zhang, Beijing (CN); Yangli Zheng, Beijing (CN); Naiqi Men, Beijing (CN); Hui Guo, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/043,392

(22) PCT Filed: Apr. 26, 2022

(86) PCT No.: PCT/CN2022/089323
§ 371 (c)(1),
(2) Date: Feb. 28, 2023

(87) PCT Pub. No.: WO2023/206082
PCT Pub. Date: Nov. 2, 2023

(65) Prior Publication Data
US 2024/0295773 A1    Sep. 5, 2024

(51) Int. Cl.
*G02F 1/13357* (2006.01)

(52) U.S. Cl.
CPC .............. *G02F 1/133608* (2013.01)

(58) Field of Classification Search
None
See application file for complete search history.

(56) References Cited

U.S. PATENT DOCUMENTS

| | | | |
|---|---|---|---|
| 2020/0186688 A1* | 6/2020 | Chen | H04N 23/54 |
| 2022/0011634 A1* | 1/2022 | Li | G02F 1/133608 |
| 2022/0026771 A1* | 1/2022 | Yan | G02B 6/0088 |

FOREIGN PATENT DOCUMENTS

| | | |
|---|---|---|
| CN | 109887410 A | 6/2019 |
| CN | 110164297 A | 8/2019 |
| CN | 110244484 A | 9/2019 |
| CN | 209642752 U | 11/2019 |
| CN | 210274158 U | 4/2020 |
| CN | 111443523 A | 7/2020 |

(Continued)

*Primary Examiner* — Phu Vu
(74) *Attorney, Agent, or Firm* — Workman Nydegger

(57) ABSTRACT

An example display device includes: a display module including a display area, a transition area and a non-display area, the display area surrounds the non-display area, and the transition area is located between the display area and the non-display area; a backlight module arranged on a side of the display module away from a display side; the backlight module includes a backplane arranged on a side of the backlight module away from the display module, and a through hole located in the non-display area and used to accommodate an optical module; a light-shielding glue located between the display module and the backlight module, an orthographic projection of the light-shielding glue on the display module overlaps with the transition area; a glue frame located between the light-shielding glue and the backplane.

19 Claims, 18 Drawing Sheets

(56) References Cited

FOREIGN PATENT DOCUMENTS

| | | |
|---|---|---|
| CN | 111610658 A | 9/2020 |
| CN | 211627968 U | 10/2020 |
| CN | 211741787 U | 10/2020 |
| CN | 212181212 U | 12/2020 |
| CN | 212181213 U | 12/2020 |
| CN | 212276164 U | 1/2021 |
| CN | 213240761 U | 5/2021 |
| CN | 213635118 U | 7/2021 |
| CN | 113539095 A | 10/2021 |

* cited by examiner

DISPLAY DEVICE

This application is a National Stage of International Application No. PCT/CN2022/089323, filed on Apr. 26, 2022, which is hereby incorporated by reference in its entirety.

FIELD

The disclosure relates to the field of display technology, and particularly to a display device.

BACKGROUND

With the development of display technology, the full screen has a large screen occupation ratio and an ultra-narrow bezel. Compared with ordinary display screens, the full screen can greatly improve the visual effect of the viewer, and thus has received widespread attention.

SUMMARY

Specific solutions of a display device provided in the disclosure are as follows.

A display device provided in the disclosure includes: a display module including a display area, a transition area and a non-display area, where the display area surrounds the non-display area, and the transition area is located between the display area and the non-display area; a backlight module arranged on a side of the display module away from a display side; where the backlight module includes a backplane arranged on a side of the backlight module away from the display module, and a through hole located in the non-display area and used to accommodate an optical module; a light-shielding glue located between the display module and the backlight module, where an orthographic projection of the light-shielding glue on the display module overlaps with the transition area; a glue frame located between the light-shielding glue and the backplane, where an orthographic projection of the glue frame on the display module and an orthographic projection of the backplane on the display module overlap in a part of the transition area, and the orthographic projection of the glue frame on the display module and an orthographic projection of the through hole on the display module overlap at most partially.

In some embodiments, in the above-mentioned display device according to an embodiment of the disclosure, the backplane includes a base and a bending portion, the base is arranged parallel to the display module, the bending portion surrounds the through hole in a space between a surface on a side of the base away from the display module and a surface on a side of the display module facing the base, an orthographic projection of the base on the display module is arranged in the display area and the transition area, and an orthographic projection of the bending portion on the display module is at least partially arranged in the transition area.

In some embodiments, in the above-mentioned display device according to an embodiment of the disclosure, an angle between the bending portion and the base is in a range of 0° to 180°.

In some embodiments, in the above-mentioned display device according to an embodiment of the disclosure, along a same radial position of the through hole, a distance value between terminals of the light-shielding glue and the glue frame on a same side close to the through hole is a, $0 \leq |a| \leq 0.3$ mm, and a thickness of the light-shielding glue is in a range of 0.02 mm to 0.15 mm.

In some embodiments, in the above-mentioned display device according to an embodiment of the disclosure, the display module includes an opposing substrate including a light blocking structure, the light blocking structure does not overlap with the display area, and the light blocking structure surrounds the through hole; along the same radial position of the through hole, a terminal of the light blocking structure close to the through hole expands outward by at most 0.5 mm in a direction away from the through hole and retracts inward by at most 0.7 mm in a direction close to the through hole, with respect to a terminal of the light-shielding glue on a same side close to the through hole.

In some embodiments, in the above-mentioned display device according to an embodiment of the disclosure, the display module includes: a display substrate opposite to the opposing substrate, and a polarizer located on a side of the display substrate away from the opposing substrate, where the polarizer extends from the display area to bond with a part of the light-shielding glue; along the same radial position of the through hole, a terminal of the polarizer close to the through hole expands outward by 0.15 mm to 1.35 mm in the direction away from the through hole, with respect to the terminal of the light blocking structure on a same side close to the through hole.

In some embodiments, in the above-mentioned display device according to an embodiment of the disclosure, the angle between the bending portion and the base is 90°.

In some embodiments, in the above-mentioned display device according to an embodiment of the disclosure, the bending portion is arranged only in the transition area.

In some embodiments, in the above-mentioned display device according to an embodiment of the disclosure, the glue frame is located on a side of the bending portion away from the through hole and a side of the base facing the display module; the orthographic projection of the glue frame on the display module only overlaps with an orthographic projection of an edge of the base adjacent to the through hole on the display module.

In some embodiments, in the above-mentioned display device according to an embodiment of the disclosure, the glue frame is arranged in the transition area and the non-display area.

In some embodiments, in the above-mentioned display device according to an embodiment of the disclosure, the glue frame is located on a side of the bending portion close to the through hole and a side of the bending portion facing the display module; the orthographic projection of the glue frame on the display module covers the orthographic projection of the bending portion on the display module.

In some embodiments, in the above-mentioned display device according to an embodiment of the disclosure, the angle between the bending portion and the base is greater than 90° and less than 180°, and the bending portion is arranged in the transition area and the non-display area.

In some embodiments, in the above-mentioned display device according to an embodiment of the disclosure, the glue frame is located on a side of the bending portion away from the through hole, a side of the bending portion facing the display module, and a side of the base facing the display module; the orthographic projection of the glue frame on the display module covers the orthographic projection of the bending portion on the display module, and overlaps with an orthographic projection of an edge of the base adjacent to the through hole on the display module.

In some embodiments, in the above-mentioned display device according to an embodiment of the disclosure, the glue frame completely wraps the bending portion, and the orthographic projection of the glue frame on the display module overlaps with an orthographic projection of an edge of the base adjacent to the through hole on the display module.

In some embodiments, in the above-mentioned display device according to an embodiment of the disclosure, a cross section of the glue frame is a rectangle on a cross section perpendicular to a diameter of the through hole.

In some embodiments, in the above-mentioned display device according to an embodiment of the disclosure, a joint cross section of the glue frame and the bending portion is a rectangle on a cross section perpendicular to a diameter of the through hole.

In some embodiments, in the above-mentioned display device according to an embodiment of the disclosure, a joint cross section of the glue frame and the bending portion is approximately a right-angled trapezoid on a cross section perpendicular to a diameter of the through hole, and a side of the joint cross section of the glue frame and the bending portion adjacent to the through hole extends obliquely toward the through hole.

In some embodiments, in the above-mentioned display device according to an embodiment of the disclosure, the right-angled trapezoid is set with a right angle adjacent to the display module missed to form a step.

In some embodiments, in the above-mentioned display device according to an embodiment of the disclosure, a ratio of a height of the step in a vertical direction of the display module to a height of the right-angled trapezoid is less than or equal to ½, and a ratio of a width of the step in a direction from the non-display area to the display area to a bottom edge of the right-angled trapezoid adjacent to the display module is less than or equal to ¾.

In some embodiments, in the above-mentioned display device according to an embodiment of the disclosure, a joint cross section of the glue frame and the bending portion is approximately a parallelogram on a cross section perpendicular to a diameter of the through hole.

In some embodiments, in the above-mentioned display device according to an embodiment of the disclosure, an acute angle adjacent to the through hole and/or an obtuse angle adjacent to the through hole is/are replaced by a right angle/right angles in the joint cross section of the glue frame and the bending portion.

In some embodiments, in the above-mentioned display device according to an embodiment of the disclosure, a height of the bending portion is less than or equal to a height of the glue frame on a cross section perpendicular to a diameter of the through hole.

In some embodiments, the above-mentioned display device according to an embodiment of the disclosure further includes a glue-fixing hole, a part of the glue-fixing hole is located at the bending portion, and another part of the glue-fixing hole is located at a junction between the bending portion and the base.

In some embodiments, in the above-mentioned display device according to an embodiment of the disclosure, the glue frame is a black glue frame, a white glue frame, a gray glue frame or a transparent glue frame.

In some embodiments, the above-mentioned display device according to an embodiment of the disclosure further includes a light-shielding element located on a side of the polarizer adjacent to the non-display area and surrounding the non-display area.

In some embodiments, in the above-mentioned display device according to an embodiment of the disclosure, the light-shielding element is located between the light-shielding glue and the display substrate, and a thickness of the light-shielding element is roughly same as a thickness of the polarizer in a vertical direction of the display module.

In some embodiments, in the above-mentioned display device according to an embodiment of the disclosure, the light-shielding element is disposed flush with the light-shielding glue on a side adjacent to the through hole.

In some embodiments, in the above-mentioned display device according to an embodiment of the disclosure, the light-shielding element includes a black base material.

In some embodiments, in the above-mentioned display device according to an embodiment of the disclosure, the light-shielding element includes a first adhesive layer located between the black base material and the light-shielding glue, and/or a second adhesive layer located on a side of the black base material away from the light-shielding glue.

In some embodiments, in the above-mentioned display device according to an embodiment of the disclosure, the light-shielding element is black silicone glue or ultraviolet glue.

In some embodiments, in the above-mentioned display device according to an embodiment of the disclosure, the glue frame is a black glue frame, the light-shielding element is located on an edge of the glue frame adjacent to the through hole, and the light-shielding element is integral with the glue frame.

In some embodiments, in the above-mentioned display device according to an embodiment of the disclosure, the light-shielding element is located between the glue frame and the display substrate, and a thickness of the light-shielding element is roughly equal to a sum of a thickness of the light-shielding glue and a thickness of the polarizer in a vertical direction of the display module.

In some embodiments, in the above-mentioned display device according to an embodiment of the disclosure, the light-shielding element is located between the glue frame and the light-shielding glue, and a thickness of the light-shielding element is roughly equal to a thickness of the polarizer in a vertical direction of the display module.

In some embodiments, in the above-mentioned display device according to an embodiment of the disclosure, the glue frame is a black glue frame, the glue frame is reused as the light-shielding element, a surface of the glue frame adjacent to the display module is a plane, and the glue frame is bonded to the display substrate through the light-shielding glue.

In some embodiments, in the above-mentioned display device according to an embodiment of the disclosure, a sidewall of the polarizer adjacent to the non-display area is blackened.

In some embodiments, in the above-mentioned display device according to an embodiment of the disclosure, a sidewall of the polarizer adjacent to the non-display area has a black coating.

In some embodiments, the above-mentioned display device according to an embodiment of the disclosure further includes the optical module arranged at the through hole, where there is a gap between the optical module and the glue frame.

In some embodiments, in the above-mentioned display device according to an embodiment of the disclosure, a terminal of the optical module adjacent to the display module is provided with a chamfer.

DETAILED DESCRIPTION OF EMBODIMENTS

In order to make the purposes, technical solutions and advantages of the disclosure clearer, the technical solutions of embodiments of the disclosure will be described clearly and completely below in combination with the accompanying drawings of embodiments of the disclosure. It should be noted that the size and shape of each diagram in the accompanying drawings do not reflect the true proportion, and are merely for purpose of schematically illustrating the content of the disclosure. Also, the same or similar reference numbers represent the same or similar elements or the elements having the same or similar functions all the way.

Unless otherwise defined, the technical terms or scientific terms used here shall have the general meanings understood by those skilled in the art. The "first", "second" and similar words used in the specification and claims of the disclosure do not represent any order, number or importance, and are only used to distinguish different components. The word such as "include" or "contain" or the like means that the element or object appearing before this word encompasses the elements or objects and their equivalents listed after this word, without excluding other elements or objects. The words such as "inner", "outer", "up", "down" are only used to represent the relative position relationship. When the absolute position of a described object changes, the relative position relationship may also change accordingly.

Figure 1:
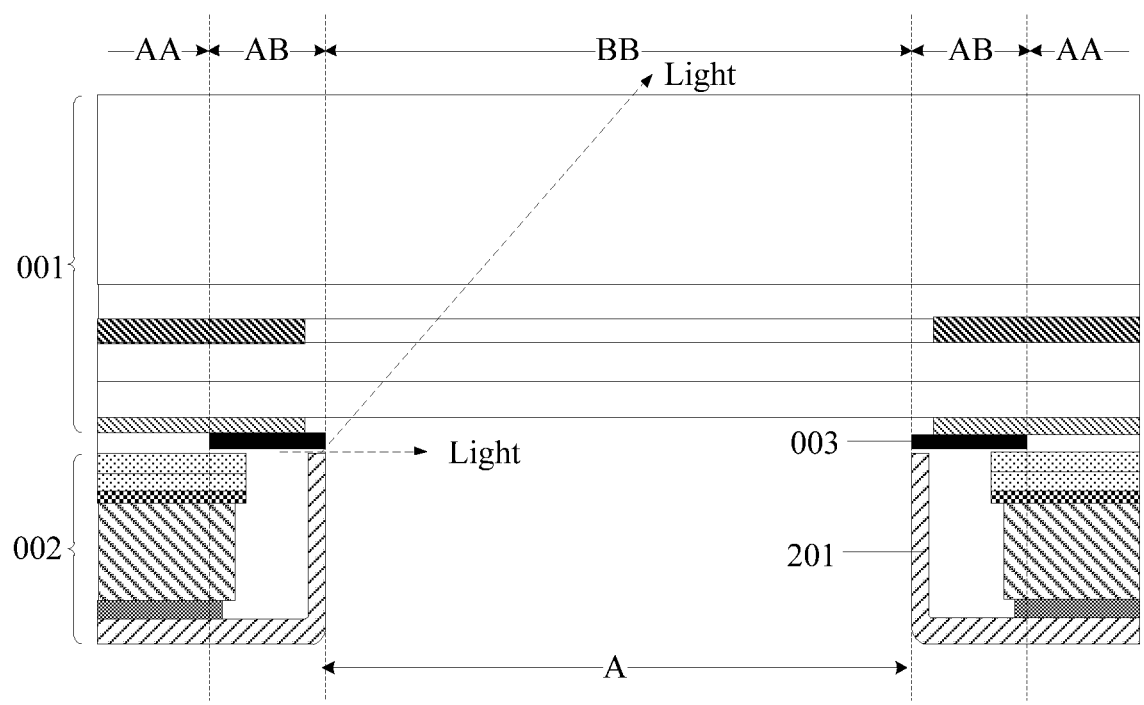
FIG. 1 is a schematic structural diagram of a display device in related art.

At present, a display device such as a mobile phone with a full screen includes a display module 001 and a backlight module 002 that are stacked, and is generally provided with a front camera to realize the selfie function. The hole scheme of the full screen is currently the most popular scheme of the front camera. As shown in FIG. 1, the hole scheme of the full screen in the related art is to punch a hole in a backplane 201 of the backlight module 002, and install a camera in a through hole A of the backplane 201. However, a wall thickness of the backplane 201 is relatively small (0.07 mm to 0.15 mm), and a bonding area between the backplane 201 and a light-shielding glue 003 is small when the backlight module 002 and the display module 001 are bonded by the light-shielding glue 003, and therefore it is easy to affect the display or photographing due to glue opening and light leakage.

Figure 2:
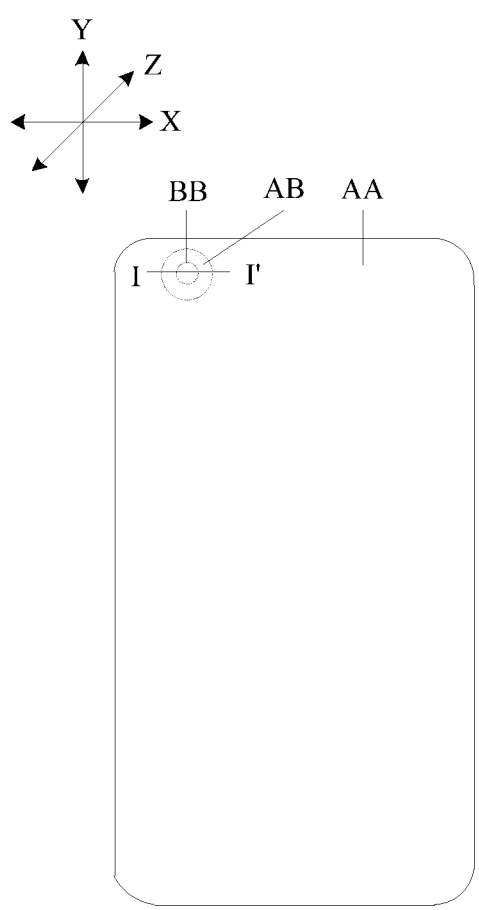
FIG. 2 is a schematic structural diagram of a display device according to an embodiment of the disclosure.
Figure 3:
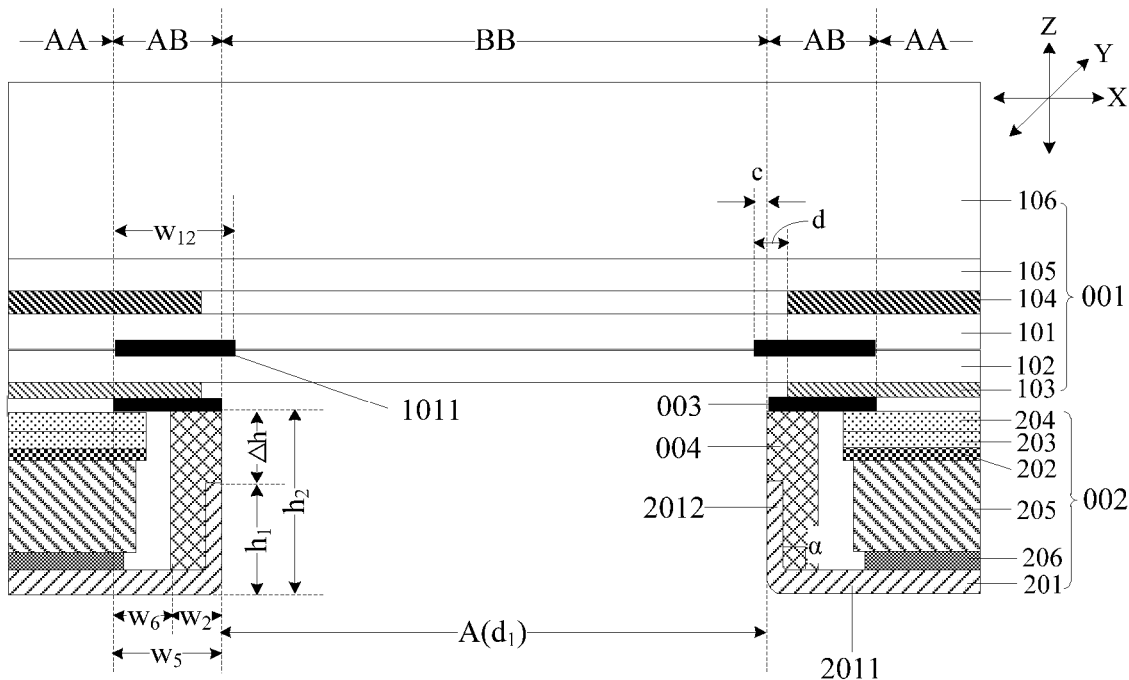
FIG. 3 is a sectional schematic diagram along the line I-I' in FIG. 2.
Figure 4:
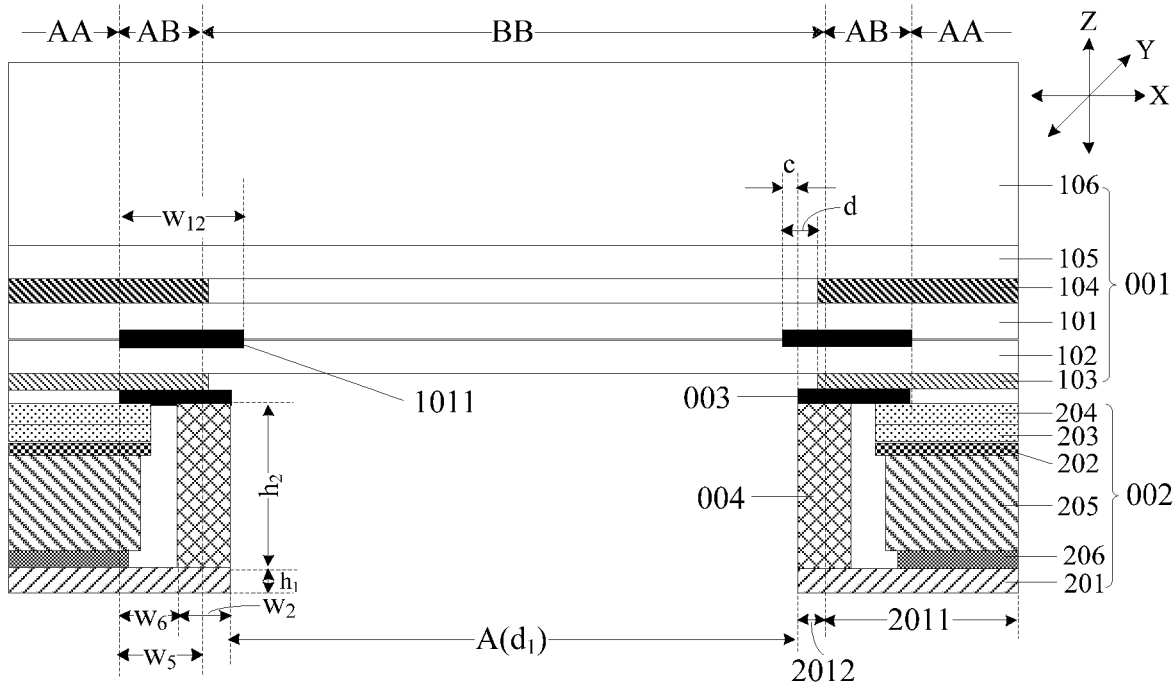
FIG. 4 is another sectional schematic diagram along the line I-I' in FIG. 2.

In order to solve the above technical problem in the related art, an embodiment of the disclosure provides a display device, as shown in FIGS. 2 to 4, including: a display module 001 including a display area AA, a transition area AB and a non-display area BB, where the display area AA surrounds the non-display area BB, and the transition area AB is located between the display area AA and the non-display area AB; a backlight module 002 arranged on a side of the display module 001 away from a display side; where the backlight module 002 includes a backplane 201 arranged on a side of the backlight module 002 away from the display module 001, and a through hole A located in the non-display area BB and used to accommodate an optical module (such as a camera module); a light-shielding glue 003 located between the display module 001 and the backlight module 002, where an orthographic projection of the light-shielding glue 003 on the display module 001 overlaps with the transition area AB, for example, the orthographic projection of the light-shielding glue 003 on the display module 001 falls into the transition area AB; or, the orthographic projection of the light-shielding glue 003 on the display module 001 coincides exactly with the transition area AB; or, the orthographic projection of the light-shielding glue 003 on the display module 001 covers the transition area AB, that is, the orthographic projection of the light-shielding glue 003 on the display module 001 is larger than the transition area AB, meaning that the transition area AB falls into the orthographic projection of the light-shielding glue 003 on the display module 001; a glue frame 004 located between the light-shielding glue 003 and the backplane 201, where an orthographic projection of the glue frame 004 on the display module 001 and an orthographic projection of the backplane 201 on the display module 001 overlap in a part of the transition area AB, and the orthographic projection of the glue frame 004 on the display module 001 and an orthographic projection of the through hole A on the display module 001 overlap at most partially, that is, the orthographic projection of the glue frame 004 on the display module 001 and the orthographic projection of the through hole A on the display module 001 may overlap partially or may not overlap with each other.

In the above-mentioned display device according to an embodiment of the disclosure, the glue frame 004 may have the bonding and supporting functions. By setting the orthographic projection of the glue frame 004 on the display module 001 and the orthographic projection of the backplane 201 on the display module 001 to overlap in a part of the transition area AB, it can ensure that the contact area of the glue frame 004, the light-shielding glue 003 and the backplane 201 in the transition area AB is relatively large, thereby avoiding glue opening, and effectively solving the problem of affecting the display or photographing due to glue opening and light leakage. At the same time, the orthographic projection of the glue frame 004 on the display module 001 overlaps with the orthographic projection of the through hole A on the display module 001 at most partially, so that the glue frame 004 does not block the through hole A or only partially blocks the through hole A, thus ensuring that the effective lighting area of the through hole A is relatively large, and the photographing effect will hardly be affected.

Optionally, the glue frame 004 may be fabricated by an injection molding process. A mold for forming the glue frame 004 may be placed at a position of the through hole A of the backplane 201, and the glue may be injected into the mold to form the glue frame 004 that is tightly bonded with the backplane 201 and is not easy to fall off. The injection molding process is mature, and has advantages of simple preparation process and low preparation cost.

In some embodiments, in the above-mentioned display device according to an embodiment of the disclosure, as shown in FIG. 3 to FIG. 15, the backplane 201 includes a base 2011 and a bending portion 2012. The base 2011 is arranged parallel to the display module 001, the bending portion 2012 surrounds the through hole A in a space between a surface on a side of the base 2011 away from the display module 001 and a surface on a side of the display module 001 facing the base 2011, an orthographic projection of the base 2011 on the display module 001 may be arranged in the display area AA and the transition area AB, and an orthographic projection of the bending portion 2012 on the display module 001 is at least partially arranged in the transition area AB. Optionally, a junction between the base 2011 and the bending portion 2012 is a boundary of the transition area AB close to the through hole A, and a terminal on a side of the light-shielding glue 003 away from the through hole A is a boundary of the transition area AB away from the through hole A. The base 2011 is bonded to the glue frame 004 around the through hole A, so that the glue frame 004 is bonded between the base 2011 and the light-shielding glue 003, ensuring the good bonding effect between the base 2011 of the backplane 201 and the light-shielding glue 003; and by bonding the bending portion 2012 to the glue frame 004 in the space between the surface on the side of the base 2011 away from the display module 001 and the surface on the side of the display module 001 facing the base 2011, the adhesive strength between the glue frame 004 and the backplane 201 is further enhanced, avoiding the glue opening risk, and improving the display or photo quality. Optionally, in order to ensure flatness of the glue frame 004, a thickness of the bending portion 2012 may be greater than or equal to 0.05 mm and less than or equal to 0.2 mm, and for example, may be 0.05 mm, 0.1 mm, 0.15 mm, 0.2 mm, etc.

In some embodiments, in the above-mentioned display device according to an embodiment of the disclosure, as shown in FIG. 3 to FIG. 15, along a same radial position of the through hole A, a distance value between terminals of the light-shielding glue 003 and the glue frame 004 on a same side close to the through hole A is a, where $0 \leq |a| \leq 0.3$ mm, meaning that the terminal of the light-shielding glue 003 close to the through hole A may not only expand outward within 0.3 mm in the direction away from the through hole A but also retract inward within 0.3 mm in the direction close to the through hole A, with respect to the terminal of the glue frame 004 close to the through hole A. Since the distance between the terminals of the light-shielding glue 003 and the glue frame 004 close to the through hole A is 0 in FIGS. 3 to 8, a is not marked in FIGS. 3 to 8. Optionally, $0 \leq |a| \leq 0.15$ mm, for example, $|a|$ is 0, 0.5 mm, 1 mm, 1.5 mm, etc. The above setting method can improve the adhesion stability of the light-shielding glue 003 and the glue frame 004, avoid the light leakage, and realize the narrow frame.

It should be noted that the light-shielding glue 003 may block a part of the through-hole A when the light-shielding glue 003 extends beyond the glue frame 004 toward the through hole A, thereby affecting the photographing effect. Therefore, in order not to affect the photographing effect as possible, the disclosure sets the distance of the light-shielding glue 003 beyond the glue frame 004 to be less than or equal to 0.3 mm. Furthermore, in order to ensure the good adhesion of the light-shielding glue 003, a thickness of the light-shielding glue 003 may be greater than or equal to 0.02 mm and less than or equal to 0.15 mm, and for example, may be 0.02 mm, 0.05 mm, 0.15 mm, etc.

In some embodiments, in the above-mentioned display device according to an embodiment of the disclosure, as shown in FIG. 3 to FIG. 15, the display module 001 includes an opposing substrate 101 including a light blocking structure 1011 that does not overlap with the display area AA, and the light blocking structure 1011 may be arranged around the through hole A. Along the same radial position of the through hole A, a terminal of the light blocking structure 1011 close to the through hole A expands outward by at most 0.5 mm in a direction away from the through hole A and retracts inward by at most 0.7 mm in a direction close to the through hole A, with respect to a terminal of the light-shielding glue 003 on a same side close to the through hole A. For example, in FIGS. 3 to 9, the inward retracted distance c of the terminal of the light blocking structure 1011 close to the through hole A in the direction close to the through hole A with respect to the terminal of the light-shielding glue 003 close to the through hole A is less than or equal to 0.7 mm; and in FIGS. 10 to 15, the outward expanded distance b of the terminal of the light blocking structure 1011 close to the through hole A in the direction away from the through hole A with respect to the terminal of the light-shielding glue 003 close to the through hole A is less than or equal to 0.5 mm.

The light blocking structure 1011 can effectively block the light of the display area AA and avoid the bright edge around the through hole A; and at the same time, it is ensured that the light blocking structure 1011 seldom blocks the through hole A, to not affect the photographing effect. Optionally, a width $w_{12}$ of the light blocking structure 1011 is greater than or equal to 0.4 mm and less than or equal to 1.5 mm, and for example, may be 0.4 mm, 0.5 mm, 1 mm, 1.5 mm, etc. A material of the light blocking structure 1011 may be a Black Matrix (BM) material or the like. In some embodiments, as shown in FIG. 3 to FIG. 15, in the direction Z perpendicular to the display module 001, the terminal of the light blocking structure 1011 away from the through hole A may be arranged flush with the terminal of the light shielding glue 003 away from the through hole A. In other words, the terminal of the light blocking structure 1011 away from the through hole A is also equivalent to a boundary of the transition area AB away from the through hole A.

In some embodiments, in the above-mentioned display device according to an embodiment of the disclosure, as shown in FIG. 3 to FIG. 15, the display module 001 further includes: a display substrate 102 opposite to the opposing substrate 101, and a first polarizer 103 located on a side of the display substrate 102 away from the opposing substrate 101. The first polarizer 103 extends from the display area AA to bond with a part of the light-shielding glue 003, that is, the first polarizer 103 has an opening extending from the non-display area BB in which the through hole A is located to overlap with a part of the transition area AB. Along the same radial position of the through hole A, the outward expanded distance d of the terminal of the first polarizer 103 close to the through hole A in the direction away from the through hole A with respect to the terminal of the light blocking structure 1011 on the same side close to the through hole A is in a range of 0.15 mm to 1.35 mm, such as 0.15 mm, 0.25 mm, 0.5 mm, 1 mm, 1.35 mm, etc. Thus, it can be ensured that the light greater than 45° in the light leakage of the sidewall of the first polarizer 103 (generally the light less than 45° will not be viewed) is blocked by the light blocking structure 1011, further avoiding the bright edge around the through hole A.

In some embodiments, as shown in FIG. 3 to FIG. 15, the display module 001 may further include a second polarizer 104, a transparent optical glue 105 and a cover plate 106 sequentially arranged on the side of the opposing substrate 101 away from the display substrate 102. Here, in order to improve the light transmittance at the through hole A, the second polarizer 104 also has an opening extending from the non-display area BB in which the through hole A is located to overlap with a part of the transition area AB, and each of the display substrate 102 and the opposing substrate 101 only has a base substrate in the non-display area BB. Optionally, openings of the second polarizer 104 and the first polarizer 103 may have the same size.

In some embodiments, in the above-mentioned display device according to an embodiment of the disclosure, as shown in FIG. 3 to FIG. 15, an angle α between the bending portion 2012 and the base 2011 may be in a range of 0° to 180°. For example, α may be in a range of 0° to 100°, and optionally, α is in a range of 90° to 100°, to facilitate the glue frame 004 to be fabricated by the injection molding process. The bending portion 2012 and the base 2011 can effectively support the glue frame 004, to make the adhesion of the glue frame 004 and the backplane 201 more stable. Optionally, the angle α between the bending portion 2012 and the base 2011 is 90°. Compared with the solution where the angle α is an acute angle or an obtuse angle, the fabrication of the bending portion 2012 can be realized by fewer punching times (for example, once), to make the fabrication of the bending portion 2012 easier.

Figure 8:
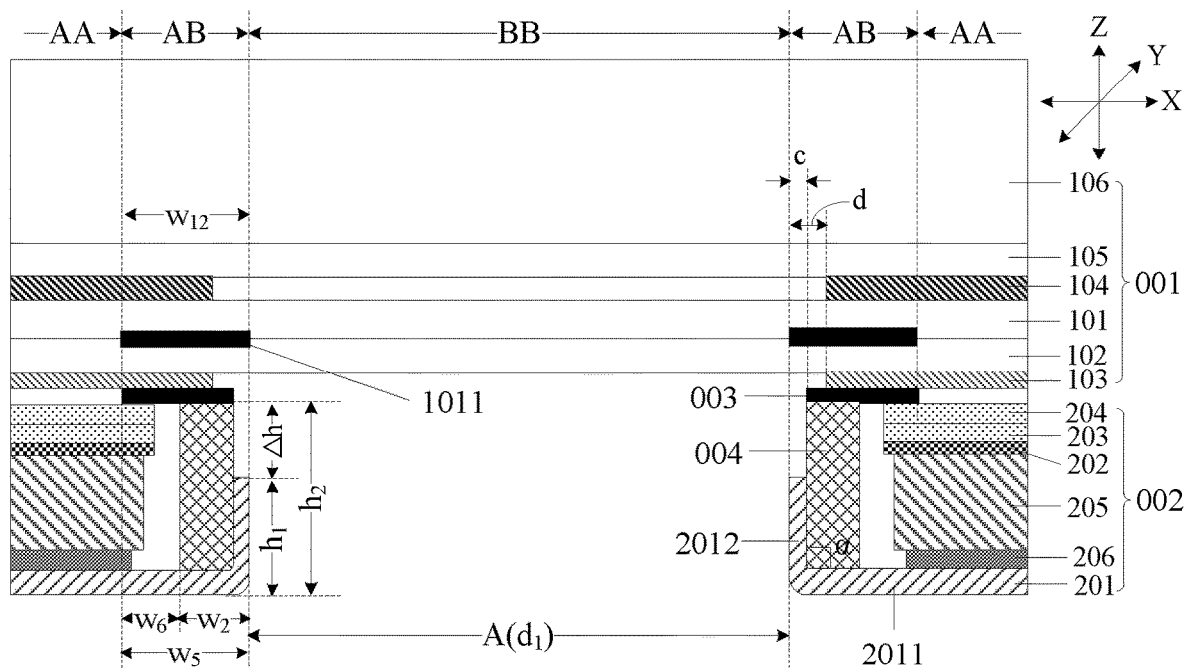
FIG. 8 is another sectional schematic diagram along the line I-I' in FIG. 2.
Figure 9:
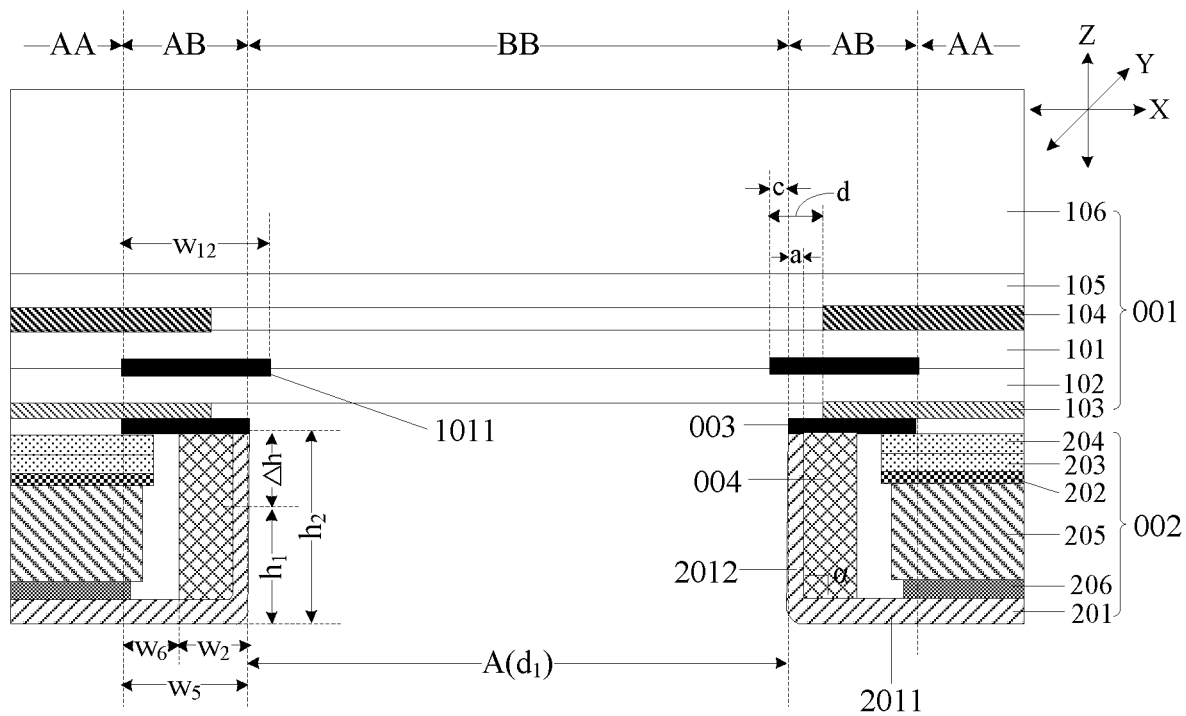
FIG. 9 is another sectional schematic diagram along the line I-I' in FIG. 2.

In some embodiments, when the angle α between the base 2011 and the bending portion 2012 is 90°, as shown in FIG. 3, FIG. 8 and FIG. 9, the bending portion 2012 may only be provided in the transition region AB. Correspondingly, as shown in FIG. 3, the glue frame 004 is located on a side of the bending portion 2012 away from the through hole A, a side of the bending portion 2012 facing the display module 001, and a side of the base 2011 facing the display module 001. The orthographic projection of the glue frame 004 on the display module 001 covers the orthographic projection of the bending portion 2012 on the display module 001 (that is, the orthographic projection of the bending portion 2012 on the display module 001 falls into the orthographic projection of the glue frame 004 on the display module 001), and overlaps with the orthographic projection of the edge of the base 2011 adjacent to the through hole A on the display module 001. Alternatively, as shown in FIG. 8 and FIG. 9, the glue frame 004 is located on the side of the bending portion 2012 away from the through hole A, and the side of the base 2011 facing the display module 001. The orthographic projection of the glue frame 004 on the display module 001 only overlaps with the orthographic projection of the edge of the base 2011 adjacent to the through hole A on the display module 001.

Figure 5:
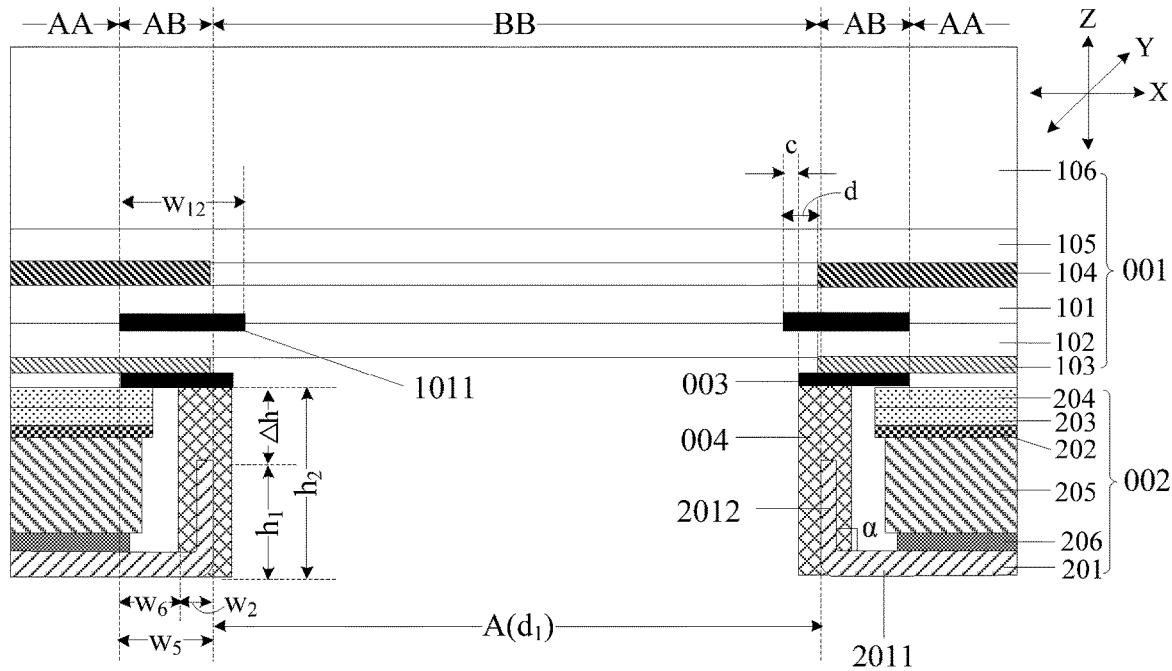
FIG. 5 is another sectional schematic diagram along the line I-I' in FIG. 2.
Figure 6:
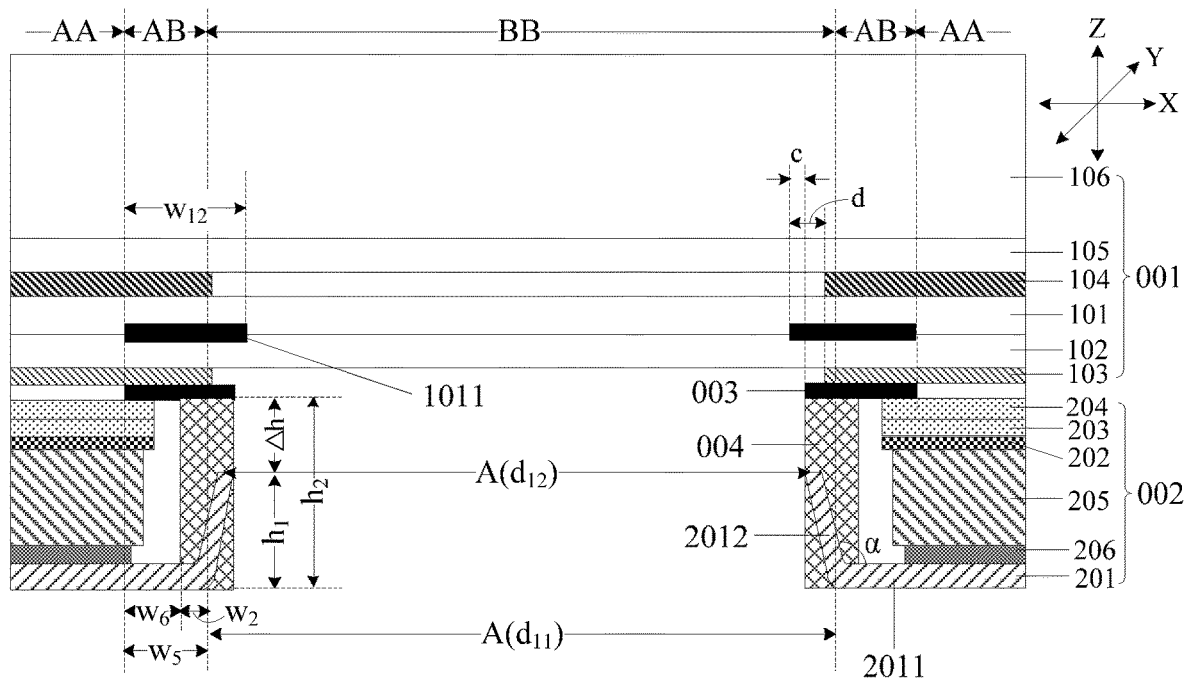
FIG. 6 is another sectional schematic diagram along the line I-I' in FIG. 2.
Figure 7:
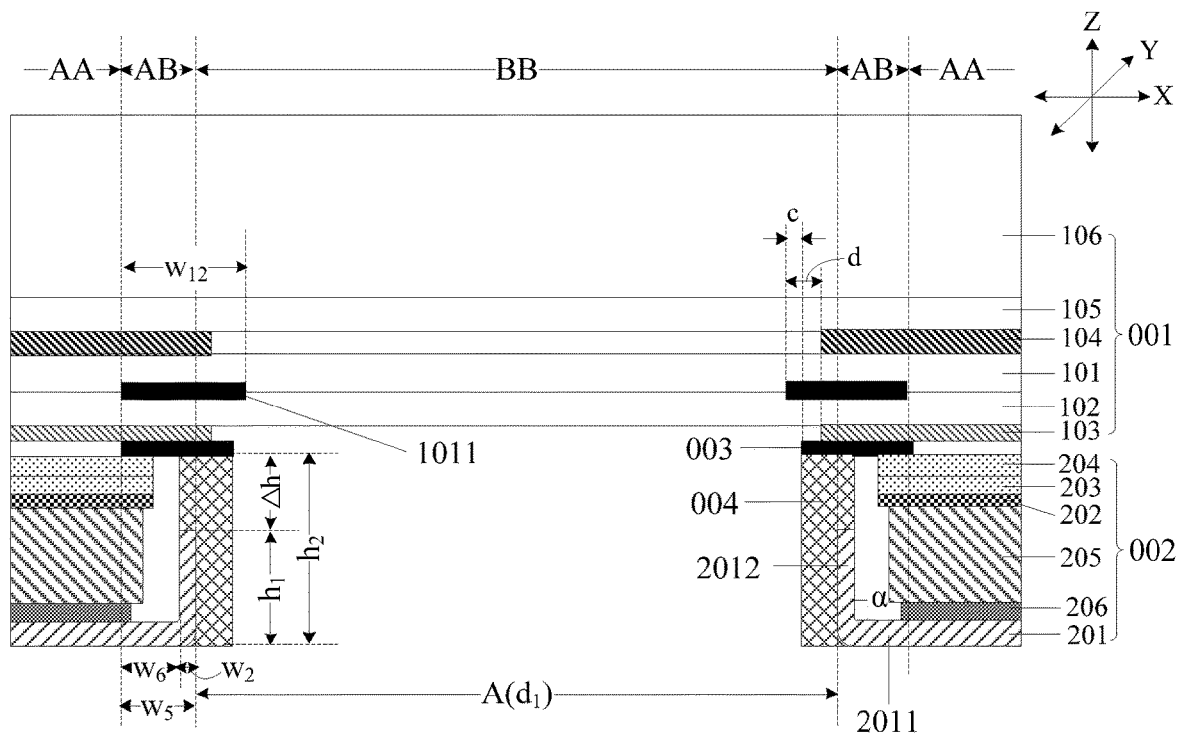
FIG. 7 is another sectional schematic diagram along the line I-I' in FIG. 2.

In some embodiments, when the angle α between the base 2011 and the bending portion 2012 is 90°, as shown in FIG. 5 and FIG. 7, the glue frame 004 can be set in the transition area AB and the non-display area BB at the same time. Optionally, in FIG. 5, the glue frame 004 completely wraps the bending portion 2012, and the orthographic projection of the glue frame 004 on the display module 001 overlaps with the orthographic projection of the edge of the base 2011 adjacent to the through hole A on the display module 001. Alternatively, as shown in FIG. 7, the glue frame 004 is located on the side of the bending portion 2012 close to the through hole A, and the side of the bending portion 2012 facing the display module 001. The orthographic projection of the glue frame 004 on the display module 001 covers the orthographic projection of the bending portion 2012 on the display module 001, that is, the orthographic projection of the bending portion 2012 on the display module 001 falls into the orthographic projection of the glue frame 004 on the display module 001.

Figure 10:
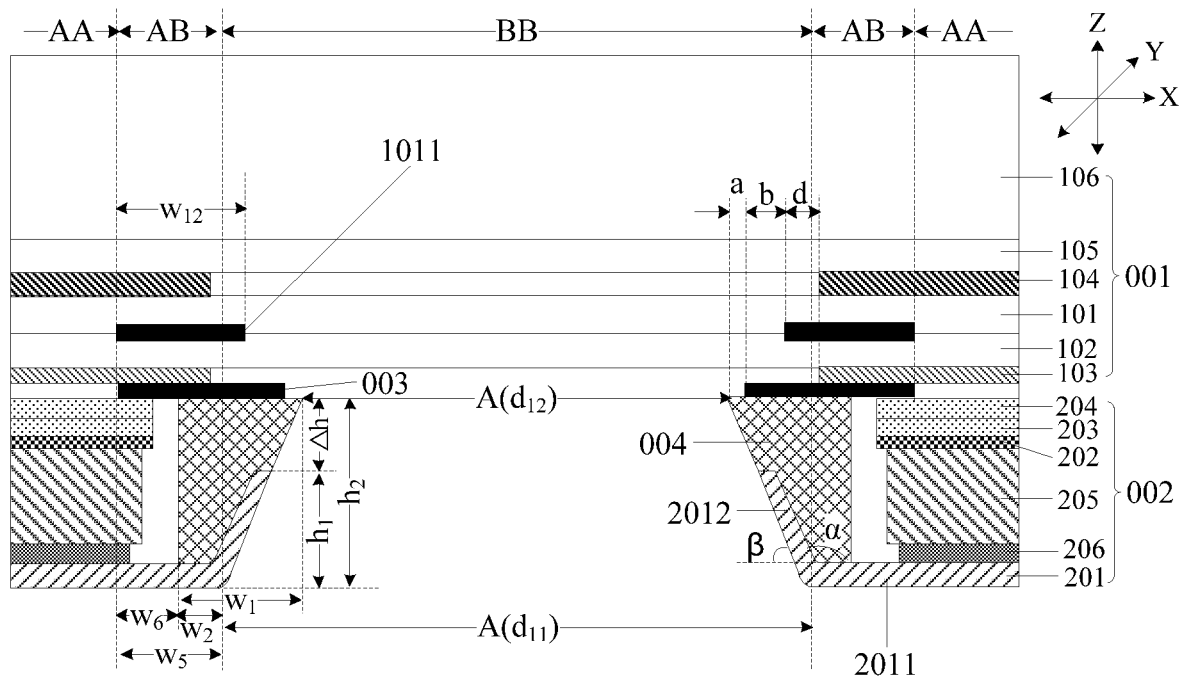
FIG. 10 is another sectional schematic diagram along the line I-I' in FIG. 2.
Figure 11:
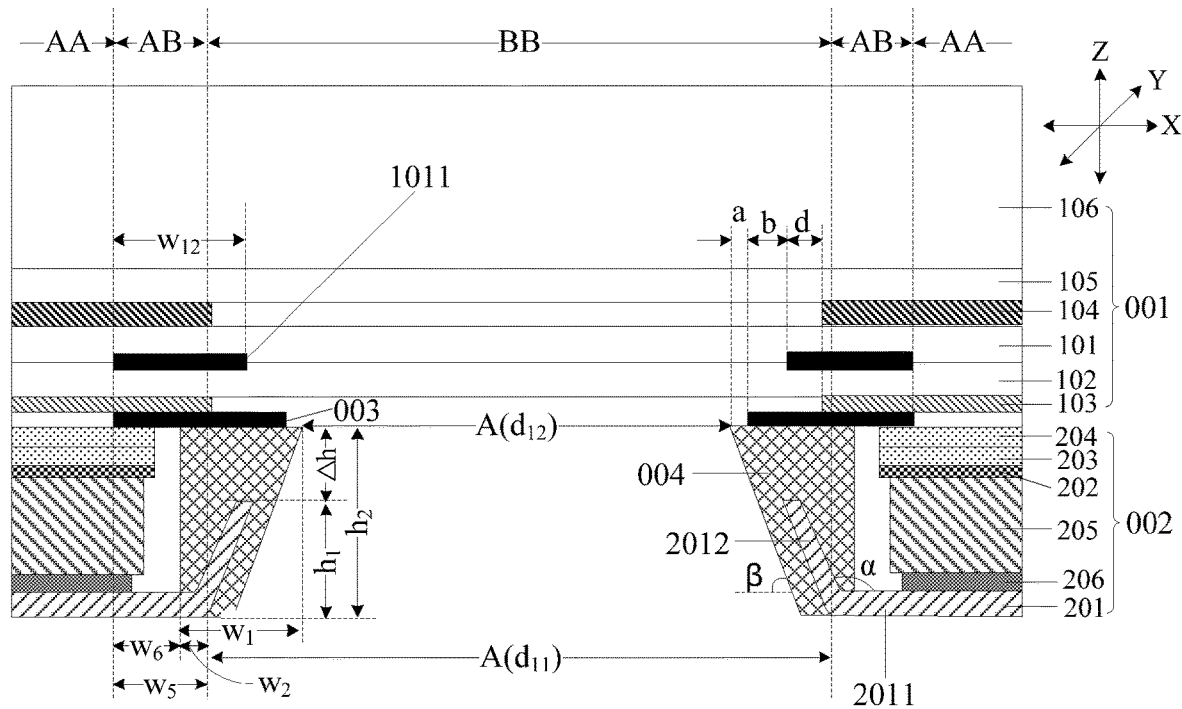
FIG. 11 is another sectional schematic diagram along the line I-I' in FIG. 2.
Figure 12:
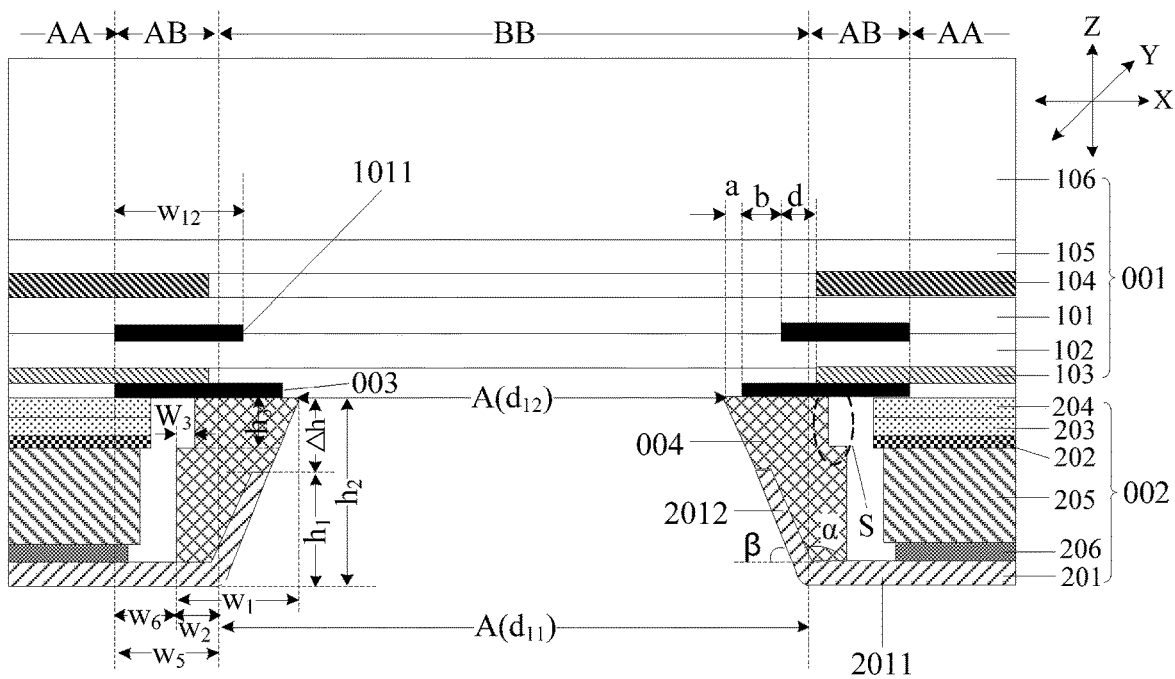
FIG. 12 is another sectional schematic diagram along the line I-I' in FIG. 2.

In some embodiments, as shown in FIG. 6, FIG. 10 to FIG. 12, the angle α between the base 2011 and the bending portion 2012 may be greater than 90° and less than 180°, and the bending portion 2012 is arranged in the transition region AB and the non-display area BB. For example, in FIG. 6 and FIG. 11, the glue frame 004 completely wraps the bending portion 2012, and the orthographic projection of the glue frame 004 on the display module 001 overlaps with the orthographic projection of the edge of the base 2011 adjacent to the through hole A on the display module 001. In FIG. 10 and FIG. 12, the glue frame 004 is located on the side of the bending portion 2012 away from the through hole A, the side of the bending portion 2012 facing the display module 001, and the side of the base 2011 facing the display module 001. The orthographic projection of the glue frame 004 on the display module 001 covers the orthographic projection of the bending portion 2012 on the display module 001 (that is, the orthographic projection of the bending portion 2012 on the display module 001 falls into the orthographic projection of the glue frame 004 on the display module 001), and overlaps with the orthographic projection of the edge of the base 2011 adjacent to the through hole A on the display module 001.

In some embodiments, in the above-mentioned display device according to an embodiment of the disclosure, in order to make the injection molding process of the glue frame 004 simple and easy to monitor the size of the glue frame 004, as shown in FIG. 3, FIG. 5 to FIG. 7, a joint cross section of the glue frame 004 and the bending portion 2012 is a rectangle on a cross section XZ perpendicular to a diameter of the through hole A. Alternatively, as shown in FIG. 4, FIG. 8 and FIG. 9, a cross section of the glue frame 004 is a rectangle. In this case, the aperture $d_1$ of the through hole A in the extending direction thereof is fixed. According to the specification of the existing camera module, the aperture $d_1$ of the through hole A may be greater than or equal to 2 mm and less than or equal to 5 mm, and for example, may be 2 mm, 3 mm, 4 mm, 5 mm, etc.

In some embodiments, in the above-mentioned display device according to an embodiment of the disclosure, as shown in FIG. 10 to FIG. 12, a joint cross section of the glue frame 004 and the bending portion 2012 is approximately a right-angled trapezoid on the cross section XZ perpendicular to the diameter of the through hole A. For example, in FIGS. 10 and 11, the joint cross section of the glue frame 004 and the bending portion 2012 is a right-angled trapezoid. In FIG. 12, the joint cross section of the glue frame 004 and the bending portion 2012 is set with a corner adjacent to the display module 001 missed, which may be equivalent to a right-angled trapezoid. The side of the joint cross section of the glue frame 004 and the bending portion 2012 adjacent to the through hole A extends obliquely toward the through hole A (that is, the hypotenuse of the right-angled trapezoid is adjacent to the through hole A), so that the effective lighting area in the through hole A that does not overlap with the glue frame 004 gradually decreases in the direction Z pointing to the display module 001, thereby ensuring that the contact area between the glue frame 004 and the light-shielding glue 003 is relatively large, and the risk of glue opening is low. In some embodiments, as shown in FIG. 10 to FIG. 12, a width $w_1$ of the surface of the glue frame 004 adjacent to the display module 001 (that is, the upper surface of the glue frame 004 adjacent to the display module 001) may be greater than or equal to 0.15 mm and less than or equal to 2 mm, and for example, may be 0.15 mm, 0.5 mm, 1 mm, 1.5 mm, 2 mm, etc. The maximum distance $w_2$ from the through hole A to the contact surface of the glue frame 004 and the base 2011 may be smaller than the width $w_1$ of the surface of the glue frame 004 adjacent to the display module 001 (that is, the upper surface of the glue frame 004 adjacent to the display module 001) by no more than 1.2 mm. For example, the maximum distance $w_2$ from the through hole A to the contact surface of the glue frame 004 and the base 2011 is greater than or equal to 0.15 mm and less than or equal to 0.8 mm, and for example, may be 0.15 mm, 0.2 mm, 0.3 mm, 0.4 mm, 0.5 mm, 0.6 mm, 0.7 mm, 0.8 mm, etc.

In some embodiments, in the above-mentioned display device according to an embodiment of the disclosure, as shown in FIG. 12, the right-angled trapezoid is set with a right angle adjacent to the display module 001 missed to form a step S. In this way, sizes of optical film materials such as the diffusion sheet 202, the first prism 203 and the second prism 204 included in the backlight module 002 can be increased, which is beneficial to improve the display brightness and enhance the display effect. Moreover, in this case, as shown in FIG. 12, a ratio of a height $h_3$ of the step S in the vertical direction Z of the display module 001 to a height $h_2$ of the right-angled trapezoid is less than or equal to ½, and optionally, $h_3$ may be less than or equal to 1.45 mm. A ratio of a width $w_3$ of the step S in the direction from the non-display area BB to the display area AA to a bottom edge (i.e., $w_1$) of the right-angled trapezoid adjacent to the display module 001 is less than or equal to ¾, and optionally, $w_3$ is less than or equal to 1.5 mm.

Figure 13:
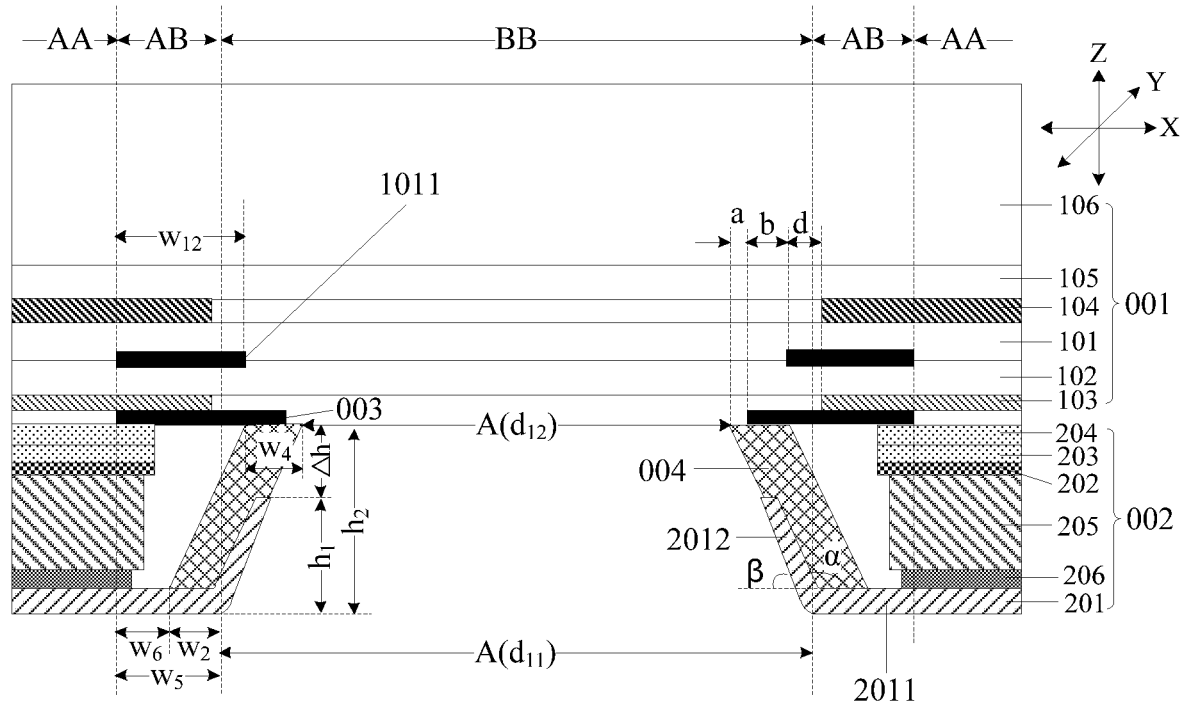
FIG. 13 is another sectional schematic diagram along the line I-I' in FIG. 2.

In some embodiments, in the above-mentioned display device according to an embodiment of the disclosure, as shown in FIG. 13, the joint cross section of the glue frame 004 and the bending portion 2012 is approximately a parallelogram on the cross section XZ perpendicular to the diameter of the through hole A. This setting method can not only ensure the bonding effect of the glue frame 004, the light-shielding glue 003 and the backplane 20, but also increase the sizes of the optical film materials such as the diffusion sheet 202, the first prism 203 and the second prism 204 included in backlight module 002, which is beneficial to improve the display brightness and make the display effect better. At the same time, the overlapping area between the glue frame 004 and the through hole A (equivalent to the frame area of the through hole A) can also be extremely small, thereby hardly affecting the size of the camera module, and ensuring the photographing effect.

Optionally, the joint cross section of the glue frame 004 and the bending portion 2012 is exactly a parallelogram. Alternatively, for the joint cross section of the glue frame 004 and the bending portion 2012, the side length adjacent to the backplane 201 (equivalent to the maximum distance $w_2$ from the through hole A to the contact surface of the glue frame 004 and the base 2011) is approximate to the side length adjacent to the display module 001 (equivalent to the width $w_4$ of the upper surface of the glue frame 004 adjacent to the display module 001), so that the joint cross section of the glue frame 004 and the bending portion 2012 can be approximated as a parallelogram. Optionally, in order to minimize the influence of the frame area of the through hole A, the side length of the parallelogram adjacent to the backplane 201 is greater than or equal to 0.15 mm and less than or equal to 0.5 mm (for example, may be 0.15 mm, 0.2 mm, 0.3 mm, 0.4 mm, 0.5 mm, etc.), and the side length of the parallelogram adjacent to the display module 001 is greater than or equal to 0.1 mm and less than or equal to 0.55 mm (for example, may be 0.1 mm, 0.2 mm, 0.3 mm, 0.4 mm, 0.5 mm, 0.55 mm, etc.).

Figure 14:
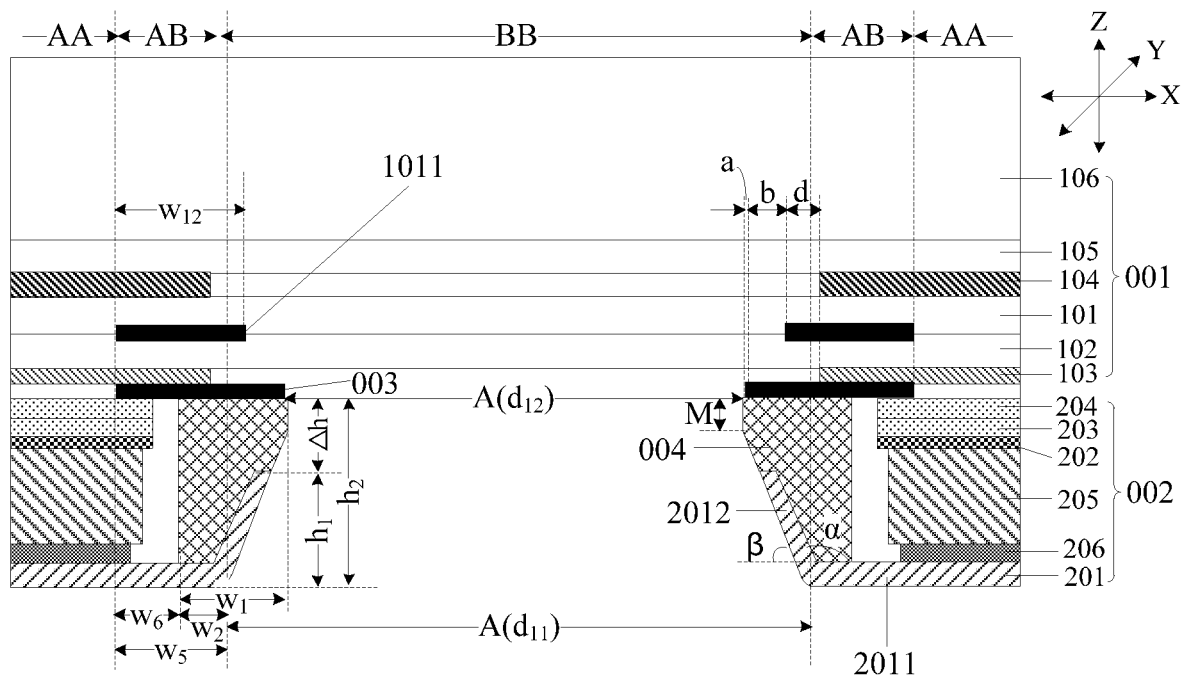
FIG. 14 is another sectional schematic diagram along the line I-I' in FIG. 2.
Figure 15:
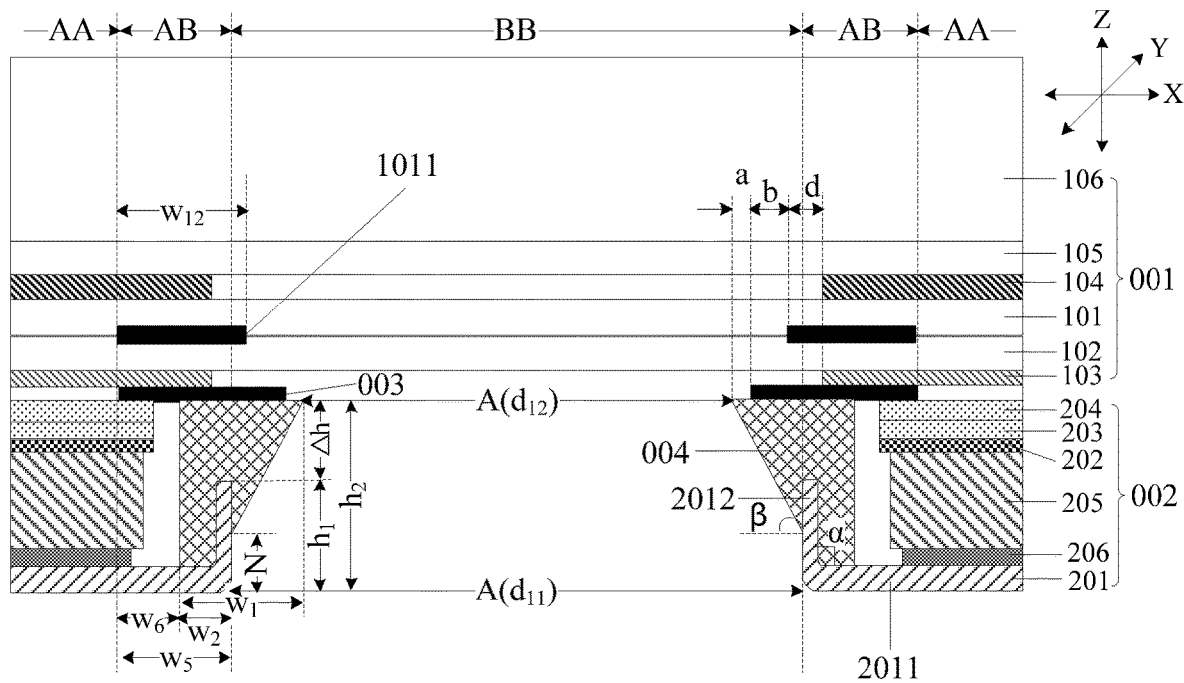
FIG. 15 is another sectional schematic diagram along the line I-I' in FIG. 2.

In some embodiments, in the above-mentioned display device according to an embodiment of the disclosure, as shown in FIG. 14 and FIG. 15, an acute angle adjacent to the through hole A and/or an obtuse angle adjacent to the through hole A is/are replaced by a right angle/right angles in the joint cross section (such as right-angled trapezoid, parallelogram) of the glue frame 004 and the bending portion 2012. In some embodiments, the side length of the right angle in the vertical direction Z of the display module 001 is less than or equal to 1.4 mm, and for example, may be 0.5 mm, 1 mm, 1.4 mm, etc. Optionally, as shown in FIG. 14, the side length M of the right angle obtained by replacing the acute angle adjacent to the through hole A in the joint cross section (such as right-angled trapezoid, parallelogram) of the glue frame 004 and the bending portion 2012 is less than or equal to 1.4 mm, and for example, may be 0.5 mm, 1 mm, 1.4 mm, etc. As shown in FIG. 15, the side length N of the right angle obtained by replacing the obtuse angle adjacent to the through hole A in the joint cross section (such as right-angled trapezoid, parallelogram) of the glue frame 004 and the bending portion 2012 is less than or equal to 1.3 mm, and for example, may be 0.5 mm, 1 mm, 1.3 mm, etc. In a specific implementation, a mold with an opening of the same size as the joint size of the glue frame 004 and the bending portion 2011 may be used, and the glue material is injected into the opening of the mold to form the glue frame 004 that is tightly bonded with the backplane 201 and is not easy to fall off.

By replacing the acute angle adjacent to the through hole A and/or the obtuse angle adjacent to the through hole A in the joint cross section (such as right-angled trapezoid, parallelogram) of the glue frame 004 and the bending portion 2012 with a right angle, it is convenient to measure the aperture of the through hole A. In some embodiments, as shown in FIGS. 10 to 15, the maximum aperture $d_{11}$ enclosed by the glue frame 004 and the bending portion 2012 is greater than or equal to 2 mm and less than or equal to 5 mm, and for example, may be 2 mm, 3 mm, 4 mm, 5 mm, etc. The minimum aperture $d_{12}$ may be less than the maximum aperture $d_{11}$ by no more than 3 mm. Optionally, the minimum aperture $d_{12}$ is greater than or equal to 1.5 mm and less than 5 mm, and for example, may be 1.5 mm, 2 mm, 3 mm, 4 mm, 4.5 mm, etc.

In some embodiments, in the above-mentioned display device according to an embodiment of the disclosure, as shown in FIGS. 10 to 15, the inclination angle β of the joint cross section of the glue frame 004 and the bending portion 2012 adjacent to the through hole A is greater than or equal to 10° and less than 90°, and for example, may be 10°, 45°, 60°, 90°, etc. Such setting can make the surface of the glue frame 004 adjacent to the display module 001 have a larger bonding area with the light-shielding glue 003 to reduce the risk of glue opening, and at the same time, ensure that the overlapping area between the through hole A and the glue frame 004 (equivalent to the frame area of the through hole A) is relatively small, and the effective lighting area of the through hole A is relatively large, to not affect the photographing effect.

In some embodiments, in the above-mentioned display device according to an embodiment of the disclosure, as shown in FIG. 3 and FIG. 5 to FIG. 15, in order to enhance the bonding effect between the glue frame 004 and the backplane 201 so that the backplane 201 and the glue frame 004 are not easily separated, the height $h_1$ of the bending portion 2012 may be less than or equal to the height $h_2$ of the glue frame 004 in the vertical direction Z of the display module 001. Optionally, the height difference Δh between the glue frame 004 and the bending portion 2012 is greater than or equal to 0 mm and less than or equal to 1.45 mm, and for example, may be 0.5 mm, 1 mm, 1.2 mm, 1.45 mm, etc. The height $h_1$ of the bending portion 2012 is greater than or equal to 0.1 mm and less than or equal to 1.5 mm, and for example, may be 0.1 mm, 0.5 mm, 1 mm, 1.5 mm, etc.

In some embodiments, in the above-mentioned display device according to an embodiment of the disclosure, as shown in FIG. 3 to FIG. 15, in order to not affect the effect of the display area AA to the greatest extent, the smaller width $w_5$ of the transition area AB is better on the basis of ensuring the stable adhesion between the light-shielding glue 003 and the glue frame 004. The width $w_5$ of the transition area AB consists of two parts, which are the minimum distance $w_6$ from the glue frame 004 to the display area AA and the maximum distance $w_2$ from the through hole A to the contact surface of the glue frame 004 and the base 2011. The minimum distance $w_6$ from the glue frame 004 to the display area AA mainly needs to consider reducing the lap joint width of the light-shielding glue 003 and the second prism 204, as well as the risk caused by the gaps between the diffusion sheet 202, the first prism 203, the second prism 204, the light guide plate 205, the reflection sheet 206, etc. included in the backlight module 002 and the glue frame 004. In the disclosure, the gaps may be set to be greater than or equal to 0.2 mm and less than or equal to 0.5 mm, and for example, may be 0.2 mm, 0.3 mm, 0.4 mm, 0.5 mm, etc. The maximum distance $w_2$ from the through hole A to the contact surface of the glue frame 004 and the base 2011 mainly depends on the molding capability of the injection mold. On the basis of ensuring the stable adhesion between the light-shielding glue 003 and the glue frame 004, the maximum distance $w_2$ from the through hole A to the contact surface of the glue frame 004 and the base 2011 is greater than or equal to 0.15 mm and less than or equal to 0.8 mm, and for example, may be 0.15 mm, 0.2 mm, 0.3 mm, 0.4 mm, 0.5 mm, 0.6 mm, 0.7 mm, 0.8 mm, etc. Correspondingly, the width $w_5$ of the transition area may be greater than or equal to 0.35 mm and less than or equal to 1.3 mm, and for example, may be 0.35 mm, 0.5 mm, 1 mm, 1.3 mm, etc.

In some embodiments, in the above-mentioned display device according to an embodiment of the disclosure, the glue frame 004 may be a black glue frame, a white glue frame, a gray glue frame or a transparent glue frame. The black glue frame absorbs light, the white glue frame reflects light, the gray glue frame can absorb light and reflect light, and the transparent glue frame transmits light, so the glue frame 004 can prevent the light of the backlight module 002 from reaching the through hole A by means of light absorption and reflection when the glue frame 004 is a black glue frame, white glue frame or gray glue frame. At this time, the backplane 201 may or may not have the bending portion 2012, and the height of the bending portion 2012 may be less than or equal to the height of the glue frame 004 when the bending portion 2012 exists. When the glue frame 004 is a transparent glue frame, the light of the backlight module 002 can pass through the transparent glue frame 004 and irradiate to the through hole A, thereby affecting the display or photographing. In order to prevent the light of the backlight module 002 from reaching the through hole A, the backplane 201 needs to have a bending portion 2012 and the height of the bending portion 2012 is equal to the height of the glue frame 004, that is, the height of the bending portion 2012 is flush with the height of the glue frame 004 on the side adjacent to the display module 001, and the bending portion 2012 and the glue frame 004 are both bonded with the light-shielding glue 003.

Furthermore, it should be noted that the backplane 201 provided in an embodiment of the disclosure may be made of a metal material, such as iron, aluminum, iron-based alloy, aluminum alloy. Since the light from the backlight module 002 irradiates on the bending portion 2022 made of metal to reflect light and thus affect the display effect, the side of the bending portion 2022 away from the through hole A is plated with the black nickel to prevent the light reflection in the related art. However, in the disclosure, when the glue frame 004 is a black glue frame, the glue frame 004 can effectively prevent the light reflection, so that there is no need to plate the black nickel on the bending portion 2022, thereby reducing the process and lowering the cost; and the frame area of the through hole A covered by the black nickel is saved, so the narrow frame effect of the through hole A can be realized.

Figure 16:
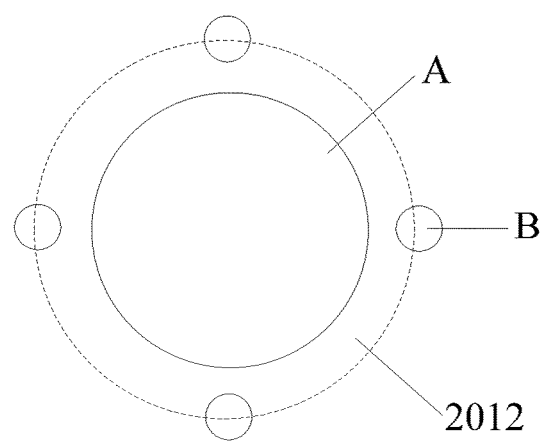
FIG. 16 is a schematic structural diagram of the through hole and glue-fixing hole in the non-display area shown in FIG. 2.
Figure 17:
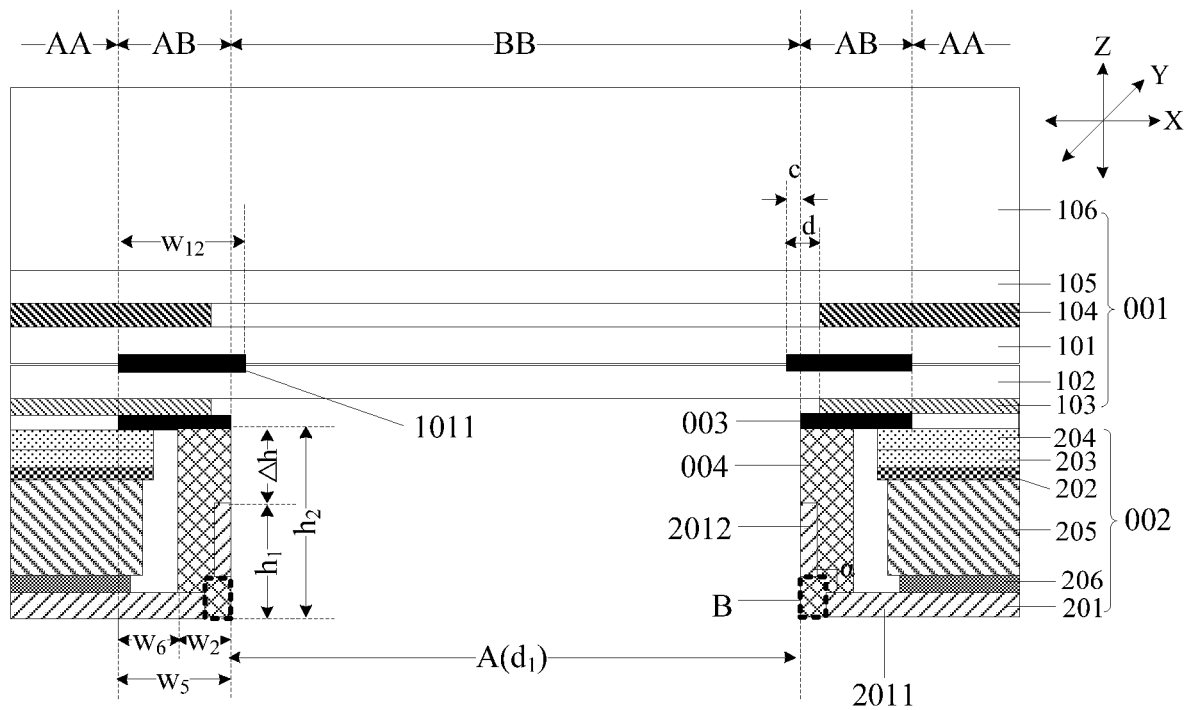
FIG. 17 is another sectional schematic diagram along the line I-I' in FIG. 2.
Figure 18:
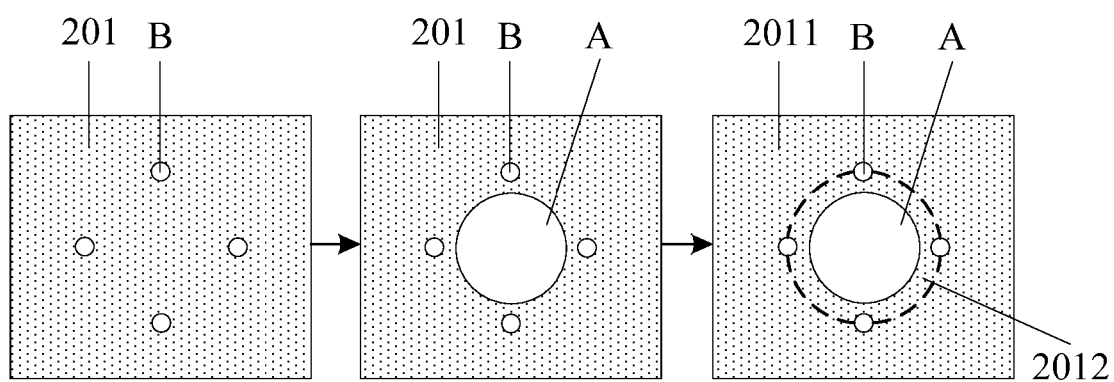
FIG. 18 is a flowchart of fabricating the through hole and glue-fixing hole according to an embodiment of the disclosure.

In some embodiments, as shown in FIG. 16 and FIG. 17, the above-mentioned display device according to an embodiment of the disclosure further includes a glue-fixing hole B, a part of the glue-fixing hole B is located at the bending portion 2012, and another part of the glue-fixing hole B is located at a junction between the bending portion 2012 and the base 2011. During the injection molding process, the glue frame 004 will fill the glue-fixing hole B, thereby increasing the adhesion stability between the glue frame 004 and the backplane 201 and reducing the risk of glue opening. In some embodiments, as shown in FIG. 18, the glue-fixing hole B is formed in the backplane 201 firstly by the punching process, next the through-hole A is formed by the punching process, then the bending portion 2012 is formed by bending the backplane 201 within a width range from a boundary of the through hole A to a center of the glue-fixing hole B, and finally the glue frame 004 is formed at the through hole A by the injection molding process. Optionally, a diameter of the glue-fixing hole B may be greater than or equal to 0.05 mm and less than or equal to 1 mm, and for example, may be 0.05 mm, 0.1 mm, 0.5 mm, 1 mm, etc. A quantity of glue-fixing holes B may be greater than or equal to 1 and less than or equal to 50, and for example, may be 5, 10, 20, 30, 40, 50, etc., and may be arranged and allocated according to actual requirements.

Figure 19:
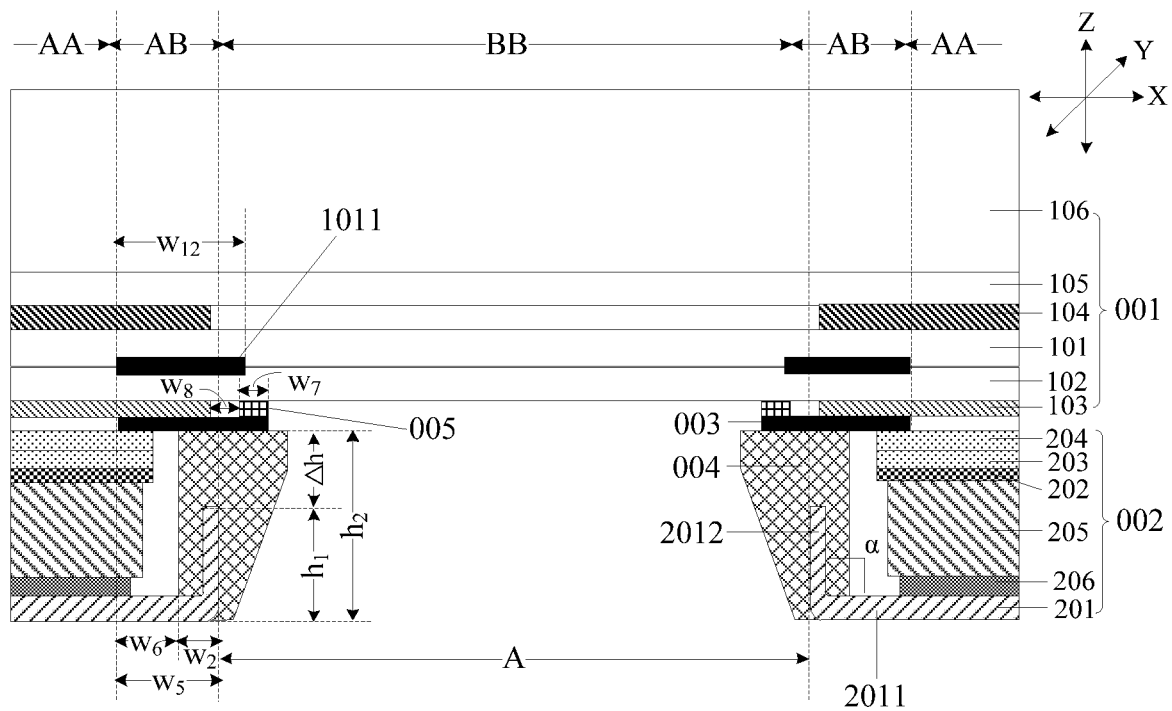
FIG. 19 is another sectional schematic diagram along the line I-I' in FIG. 2.

In some embodiments, in the above-mentioned display substrate 101 according to an embodiment of the disclosure, as shown in FIG. 19, the light of the backlight module 002 may irradiate to the through hole A through a sidewall of the first polarizer 103 around the glue-fixing hole to thereby affect photographing by the camera module, so a light-shielding element 005 may further be provided in order to block the light from the sidewall of the first polarizer 103. The light-shielding element 005 is located on a side of the first polarizer 103 adjacent to the non-display area BB and surrounding the non-display area BB.

In some embodiments, in the above-mentioned display device according to an embodiment of the disclosure, as shown in FIG. 19, the light-shielding element 005 may be located between the light-shielding glue 003 and the display substrate 101, and a thickness of the light-shielding element 005 is roughly same as a thickness of the first polarizer 103 in the vertical direction Z of the display module 001, that is, the two thicknesses may be exactly the same or within an error range (such as ±0.03 mm) caused by measurement, fabrication and other factors, to avoid the gap or interference fit between the light-shielding element 005 and the display substrate 101. Optionally, the thickness of the light-shielding element 005 may be greater than or equal to 0.01 mm and less than or equal to 0.2 mm, and for example, may be 0.01 mm, 0.05 mm, 0.1 mm, 0.2 mm, etc. A width $w_7$ of the light-shielding element 005 is greater than or equal to 0.1 mm and less than or equal to 0.6 mm, such as 0.1 mm, 0.2 mm, 0.3 mm, 0.4 mm, 0.5 mm, 0.6 mm, etc. Also, in order to avoid the overlapping interference between the light-shielding element 005 and the first polarizer 103 after the backlight module 002 and the display module 001 are assembled, it is necessary to ensure, based on the calculation of cutting and assembly accuracy, that the gap width $w_8$ between the light-shielding element 005 and the first polarizer 103 is greater than or equal to 0.05 mm and less than or equal to 0.3 mm, and for example, may be 0.05 mm, 0.1 mm, 0.2 mm, 0.3 mm, etc.

Figure 20:
FIG. 20 is a schematic structural diagram of a light-shielding element in the display device shown in FIG. 19.

In some embodiments, in the above-mentioned display device according to an embodiment of the disclosure, as shown in FIG. 19 and FIG. 20, the light-shielding element 005 may be disposed flush with the light-shielding glue 003 on a side adjacent to the through hole A, so that the light-shielding element 005 and the light-shielding glue 003 can be cut integrally to simplify the manufacturing process.

Figure 21:
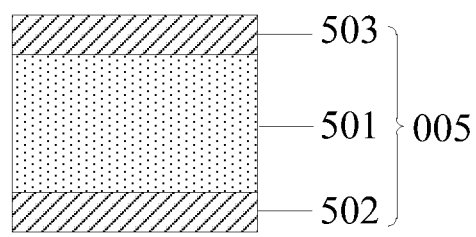
FIG. 21 is a schematic structural diagram of a light-shielding glue according to an embodiment of the disclosure.

In some embodiments, in the above-mentioned display device according to an embodiment of the disclosure, as shown in FIG. 21, the light-shielding element 005 may include a first black base material 501. Alternatively, the light-shielding element 005 may further include a first adhesive layer 502 located between the first black base material 501 and the light-shielding glue 003, and/or a second adhesive layer 503 located on a side of the first black base material 501 away from the light-shielding glue 003. Optionally, a material of the first black base material 501 may be polyethylene terephthalate (PET), foam, etc. The first adhesive layer 502 and the second adhesive layer 503 may be selected from the transparent glue, gray glue or black glue, where the black glue has a better light blocking effect.

Figure 22:
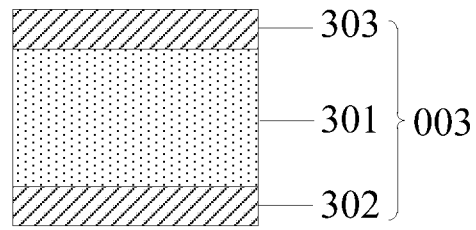
FIG. 22 is another sectional schematic diagram along the line I-I' in FIG. 2.

Optionally, as shown in FIG. 22, the light-shielding glue 003 may include a second black base material 301, and a third adhesive layer 302 and a fourth adhesive layer 303 located on both sides of the second black base material 301. Optionally, a material of the second black base material 301 may be polyethylene terephthalate (PET), foam, etc. The third adhesive layer 302 and the fourth adhesive layer 303 may be selected from the transparent glue, gray glue or black glue, where the black glue has a better light blocking effect.

Figure 23:
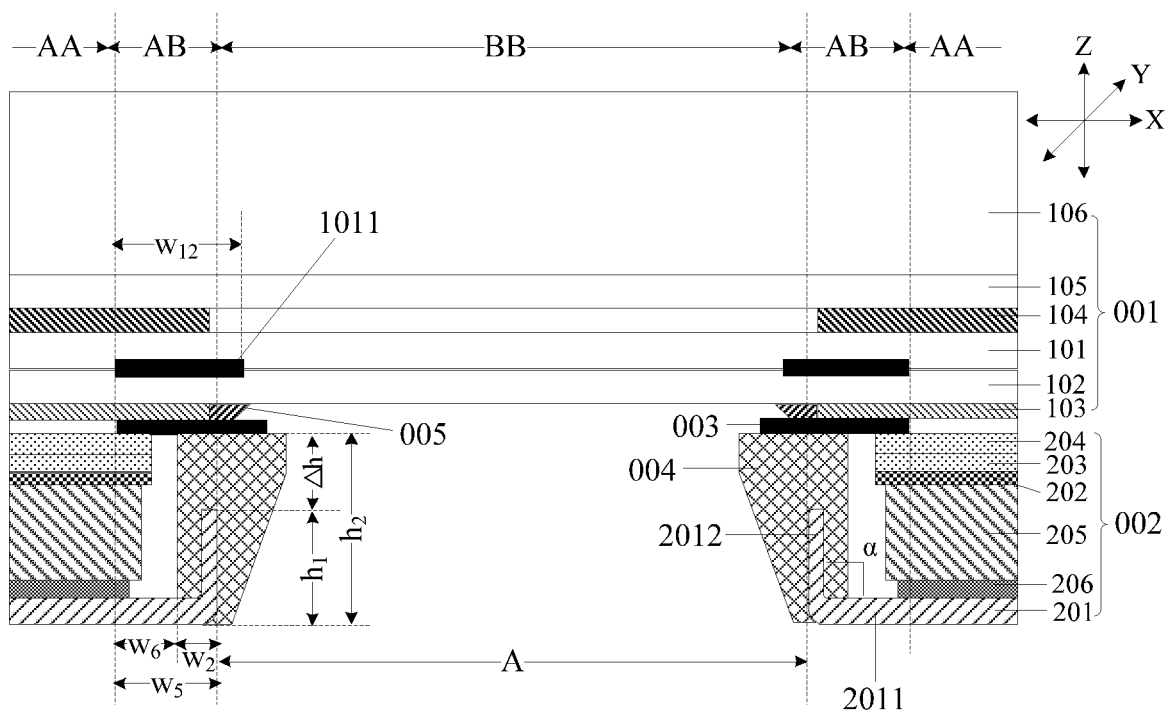
FIG. 23 is another sectional schematic diagram along the line I-I' in FIG. 2.

In some embodiments, in the above-mentioned display device according to an embodiment of the disclosure, as shown in FIG. 23, the light-shielding element 005 may also be black glue such as black silicone glue or ultraviolet glue. In this way, on one hand, light from the sidewall of the first polarizer 103 can be blocked, and on the other hand, the display substrate 101 and the light-shielding glue 003 and/or the glue frame 004 can be bonded, to reduce the risk of glue opening at openings of the backlight module 002 and the first polarizer 103.

Figure 24:
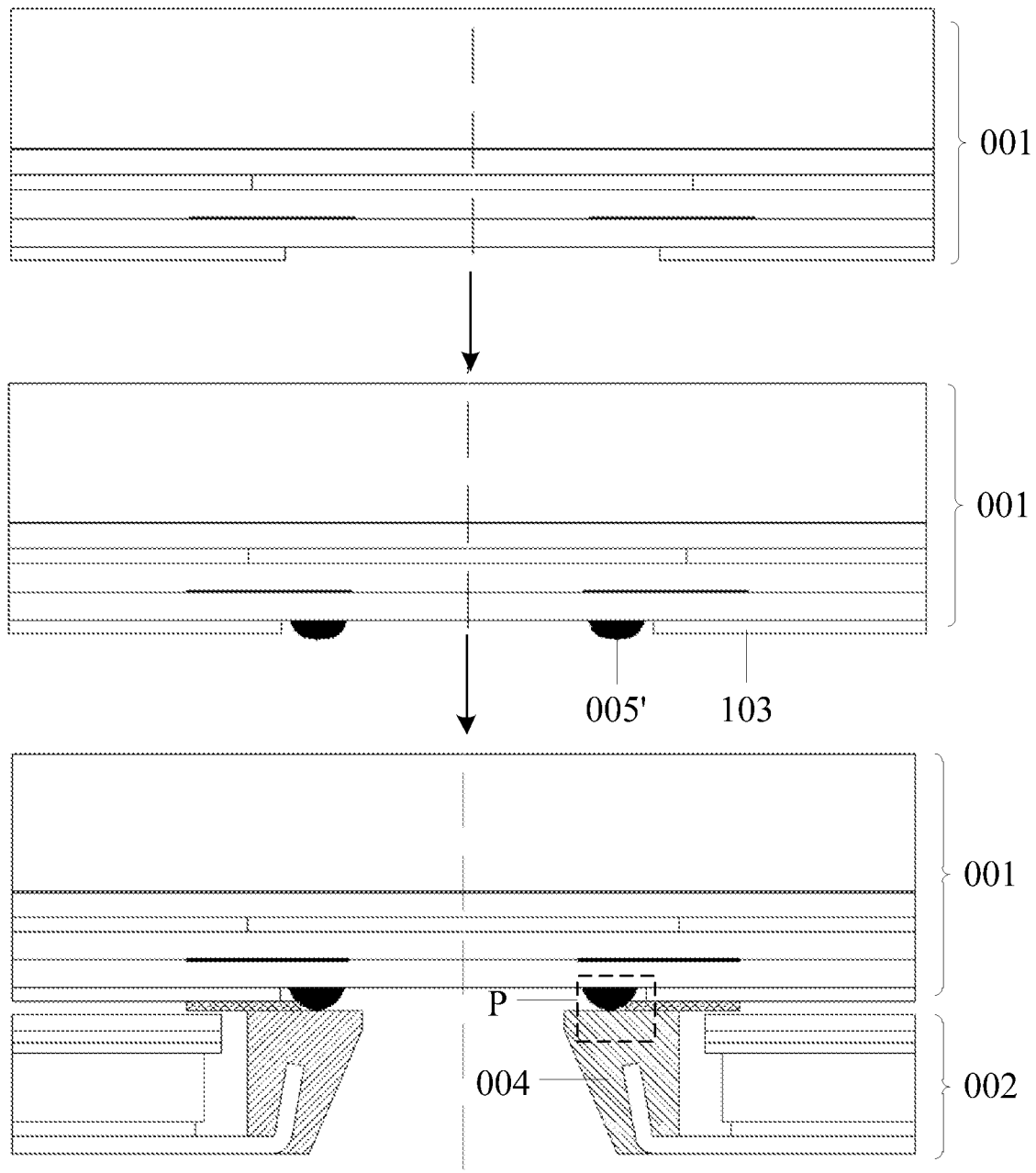
FIG. 24 is a flowchart of fabricating the light-shielding element in the display device shown in FIG. 23.
Figure 25:
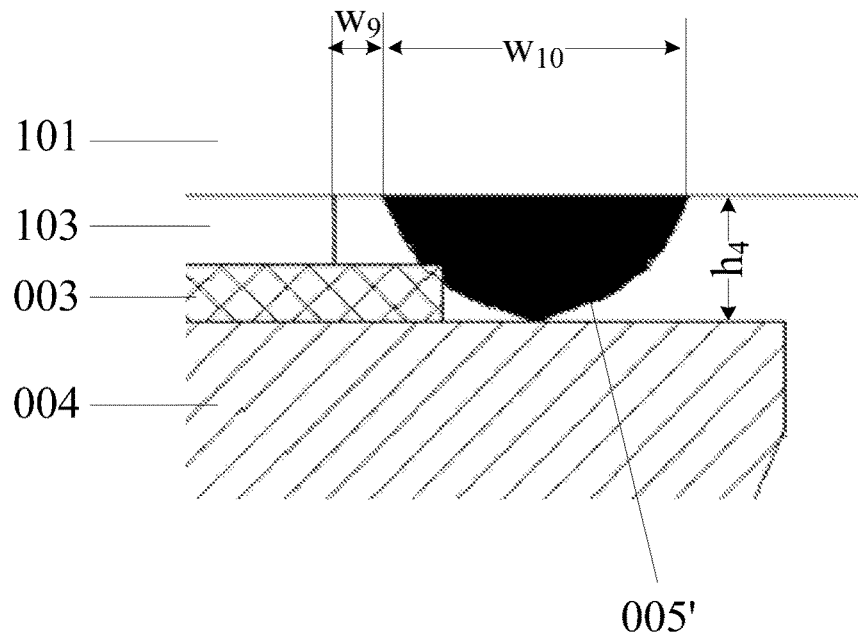
FIG. 25 is an enlarged schematic diagram of the region P in the display device shown in FIG. 24.

In some embodiments, as shown in FIG. 24, before the display module 001 and the backlight module 002 are assembled, the glue can be dispensed in the area of the opening of the first polarizer 103 adjacent to the non-display area BB. When the display module 001 and the backlight module 002 are assembled, the light-shielding glue 003 and/or the glue frame 004 and the display substrate 101 are pressed and bonded by the glue 005' to block the light emitted from the sidewall of the opening of the first polarizer 103. As shown in FIG. 25, a gap width $w_9$ between the glue 005' and the first polarizer 103 after dispensing the glue is greater than or equal to 0.05 mm and less than or equal to 2 mm, and for example, may be 0.05 mm, 0.1 mm, 0.5 mm, 1 mm, 1.5 mm, 2 mm, etc. A width $w_{10}$ of the glue is greater than or equal to 0.15 mm and less than or equal to 1.5 mm, and for example, may be 0.15 mm, 0.5 mm, 1 mm, 1.5 mm, etc. A height $h_4$ of the glue is greater than or equal to 0.05 mm and less than or equal to 0.2 mm, and for example, may be 0.05 mm, 0.1 mm, 0.15 mm, 0.2 mm, etc. Optionally, the height $h_4$ of the glue needs to be greater than the thickness of the first polarizer 103 to ensure that the glue can fill the gap between the light-shielding glue 003 or the glue frame 004 and the display substrate 101, to enhance the adhesion effect and reduce the risk of glue opening.

Figure 26:
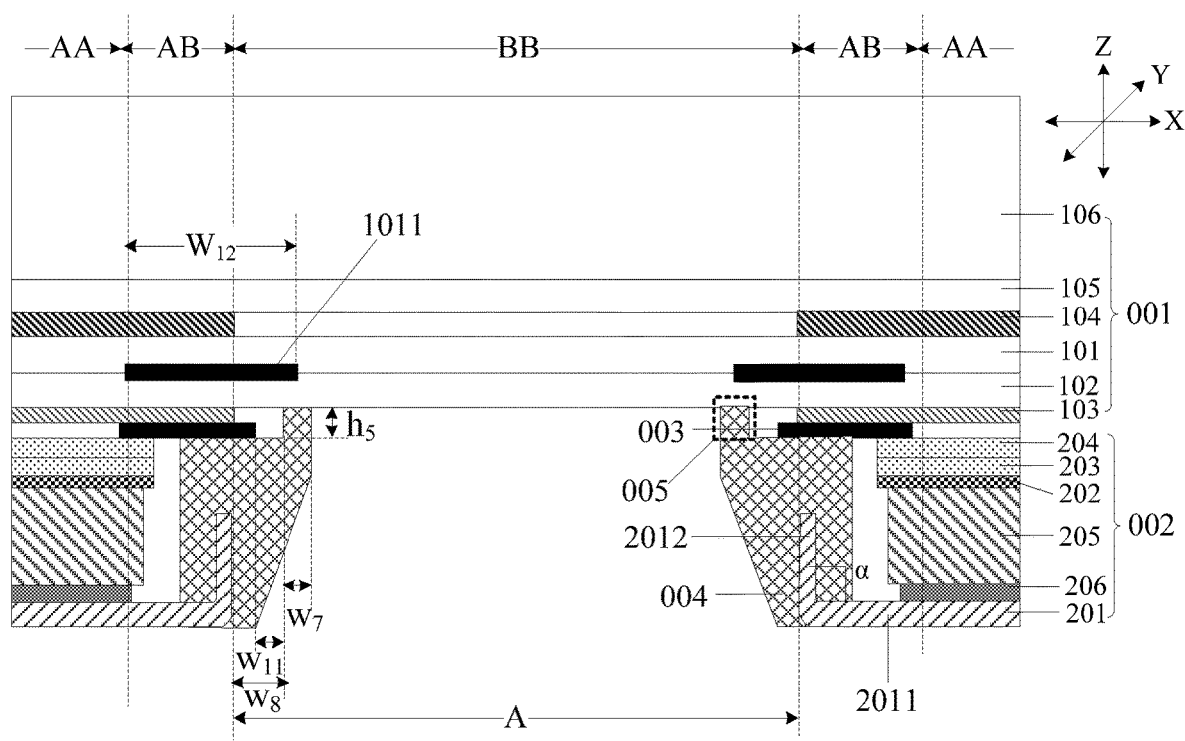
FIG. 26 is another sectional schematic diagram along the line I-I' in FIG. 2.
Figure 27:
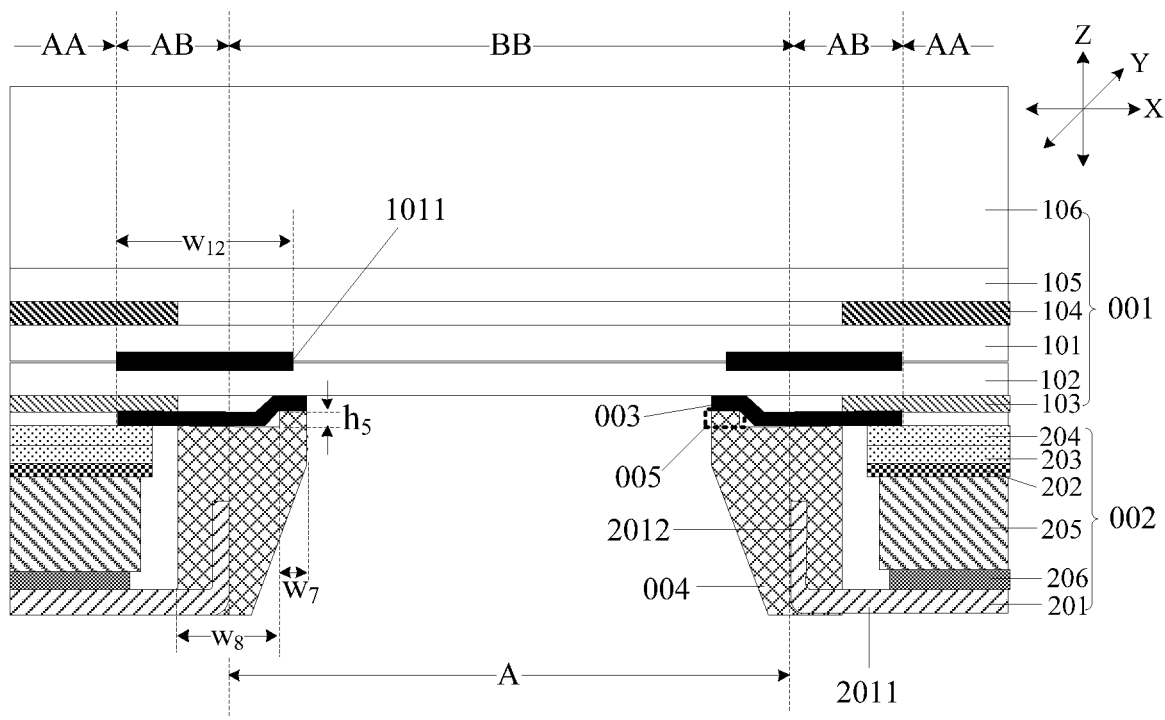
FIG. 27 is another sectional schematic diagram along the line I-I' in FIG. 2.

In some embodiments, in the above-mentioned display device according to an embodiment of the disclosure, the glue frame 004 is a black glue frame, as shown in FIG. 26 and FIG. 27. The light-shielding element 005 is located on an edge of the glue frame 004 adjacent to the through hole A, and the light-shielding element 005 can be integral with the glue frame 004, so that the glue frame 004 and the light-shielding element 005 with a step structure can be formed simultaneously through the injection molding process, and there is no need to separately fabricate the light-shielding element 005, simplifying the fabricating process, improving the production efficiency, and reducing the production cost.

In some embodiments, in the above-mentioned display device according to an embodiment of the disclosure, as shown in FIG. 26, the light-shielding element 005 is located between the glue frame 004 and the display substrate 101. In order to improve the adhesion stability between the light-shielding element 005 and the display substrate 101, a width $W_7$ of the light-shielding element 005 is greater than or equal to 0.05 mm and less than or equal to 2 mm, and for example, may be 0.05 mm, 0.5 mm, 1 mm, 1.5 mm, 2 mm, etc. In order to avoid the gap or interference fit between the light-shielding element 005 and the display substrate 101, a thickness $h_5$ of the light-shielding element 005 is approximately equal to a sum of the thickness of the light-shielding glue 003 and the thickness of the polarizer (that is, within an error range of ±0.03 mm) in the vertical direction Z of the display module 001. Optionally, the thickness $h_5$ of the light-shielding element 005 is greater than or equal to 0.01 mm and less than or equal to 0.2 mm, and for example, may be 0.01 mm, 0.1 mm, 0.2 mm, etc. On the basis of ensuring the assembly and cutting accuracy, in order to avoid the interference between the light-shielding glue 003 and the light-shielding element 005, a gap width $W_{11}$ between the light-shielding glue 003 and the light-shielding element 005 may be greater than or equal to 0.05 mm and less than or equal to 0.5 mm, and for example, may be 0.05 mm, 0.1 mm, 0.2 mm, 0.3 mm, 0.4 mm, 0.5 mm, etc. Furthermore, on the basis of the assembly and cutting accuracy, in order to avoid the interference between the first polarizer 103 and the light-shielding element 005, it is necessary to ensure that a gap width $w_8$ between the light-shielding element 005 and the first polarizer 103 is greater than or equal to 0.05 mm and less than or equal to 0.3 mm, and for example, may be 0.05 mm, 0.1 mm, 0.2 mm, 0.3 mm, etc.

Figure 28:
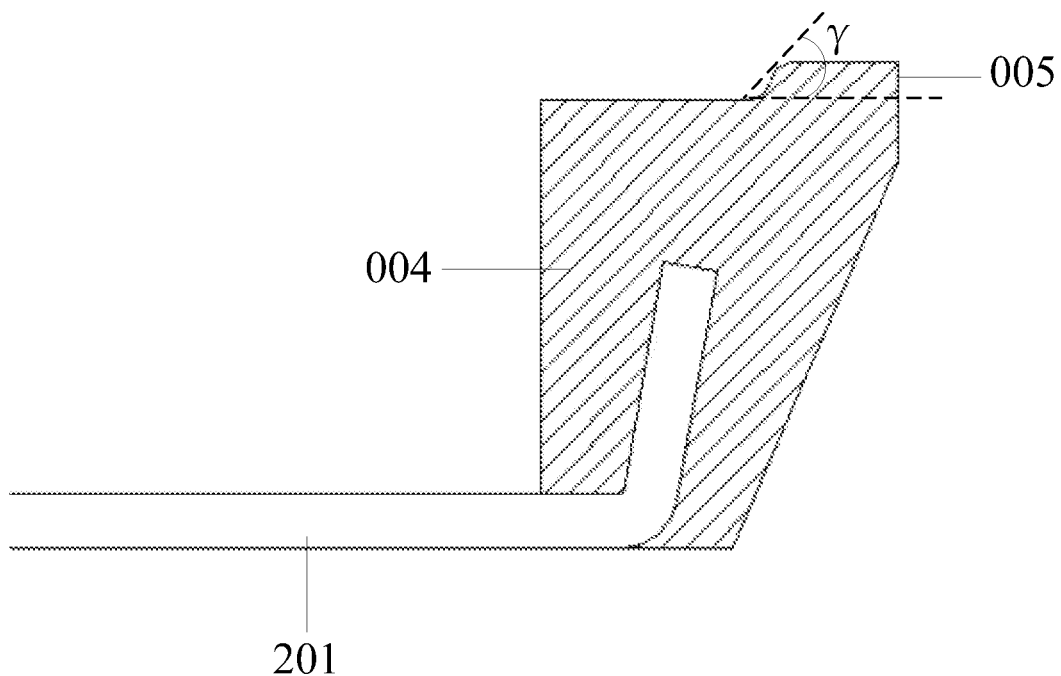
FIG. 28 is an enlarged schematic diagram of the glue frame and the light-shielding element in the display device shown in FIG. 27.

In some embodiments, in the above-mentioned display device according to an embodiment of the disclosure, as shown in FIG. 27, the light-shielding element 005 may also be located between the glue frame 004 and the light-shielding glue 003, and the light-shielding glue 003 lap-joints onto the light-shielding element 005. The advantage of this solution is that the adhesive area of the light-shielding glue 003 and the glue frame 004 is larger, and the risk of glue opening is lower. Optionally, the width $W_7$ of the light-shielding element 005 and the gap width $W_8$ between the light-shielding element 005 and the first polarizer 103 in FIG. 27 may be the same as the corresponding parameter values in FIG. 26 respectively. Moreover, as shown in FIG. 27, the thickness $h_5$ of the light-shielding element 005 is approximately equal to the thickness of the first polarizer 103 in the vertical direction Z of the display module 001, that is, the two thicknesses may be exactly the same, or within the error range (such as ±0.03 mm) caused by fabrication, measurement and other factors, so that the light-shielding element 005 is closely fitted with the display substrate 101 through the light-shielding glue 003 without defects such as gap or interference fit. Furthermore, the transition between the light-shielding element 005 and the glue frame 004 may be vertical (as shown in FIG. 26 and FIG. 27), wedge-shaped or arc-shaped (as shown in FIG. 28). Theoretically, the smaller the transition range, the better the effect. The angle γ between connecting lines of the upper inflection point and the lower inflection point (as shown in FIG. 28) is less than or equal to 90°.

Figure 29:
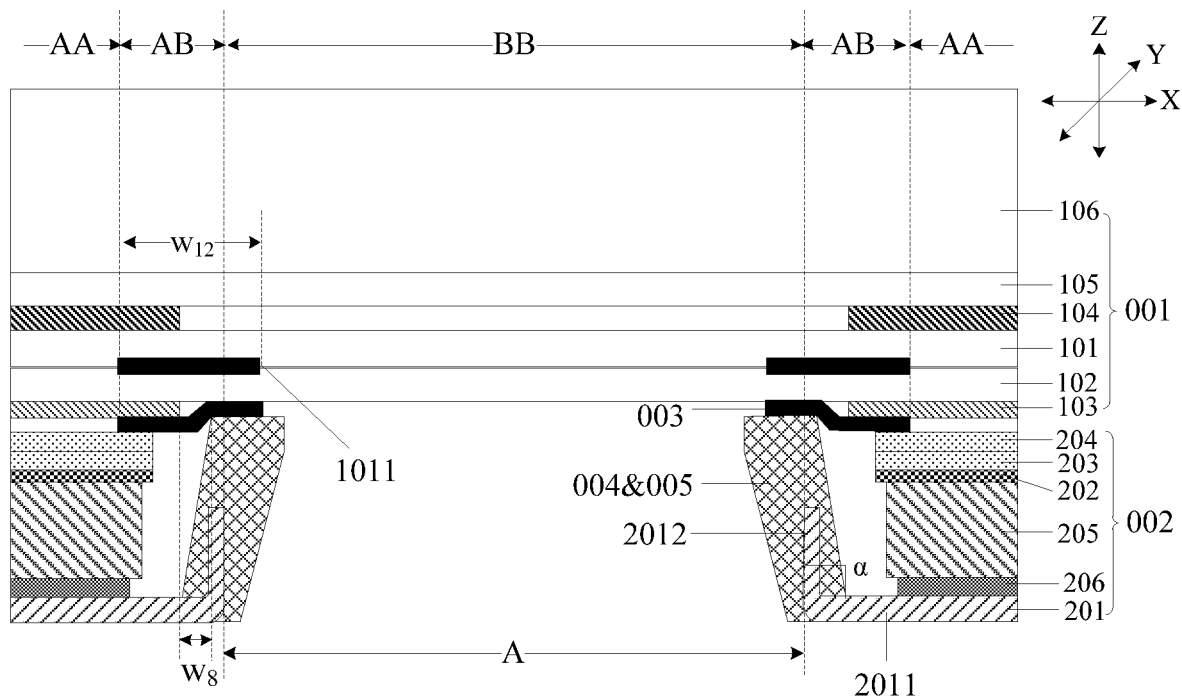
FIG. 29 is another sectional schematic diagram along the line I-I' in FIG. 2.

In some embodiments, in the above-mentioned display device according to an embodiment of the disclosure, the glue frame 004 is a black glue frame. As shown in FIG. 29, the glue frame 004 is reused as the light-shielding element 005, a surface of the glue frame 004 adjacent to the display module 001 is a plane, and the glue frame 004 is bonded to the display substrate 101 through the light-shielding glue 003. In this case, compared with the glue frame 004 that is not reused as the light-shielding element 005, the height of the glue frame 004 reused as the light-shielding element 005 increases the thickness of the first polarizer 103, so that the glue frame 004 can be used to block light leakage from the sidewall of the first polarizer 103. In FIG. 29, the gap width $W_8$ between the light-shielding element 005 and the first polarizer 103 may be the same as the corresponding parameter value in FIG. 26, and will not be repeated here.

Figure 30:
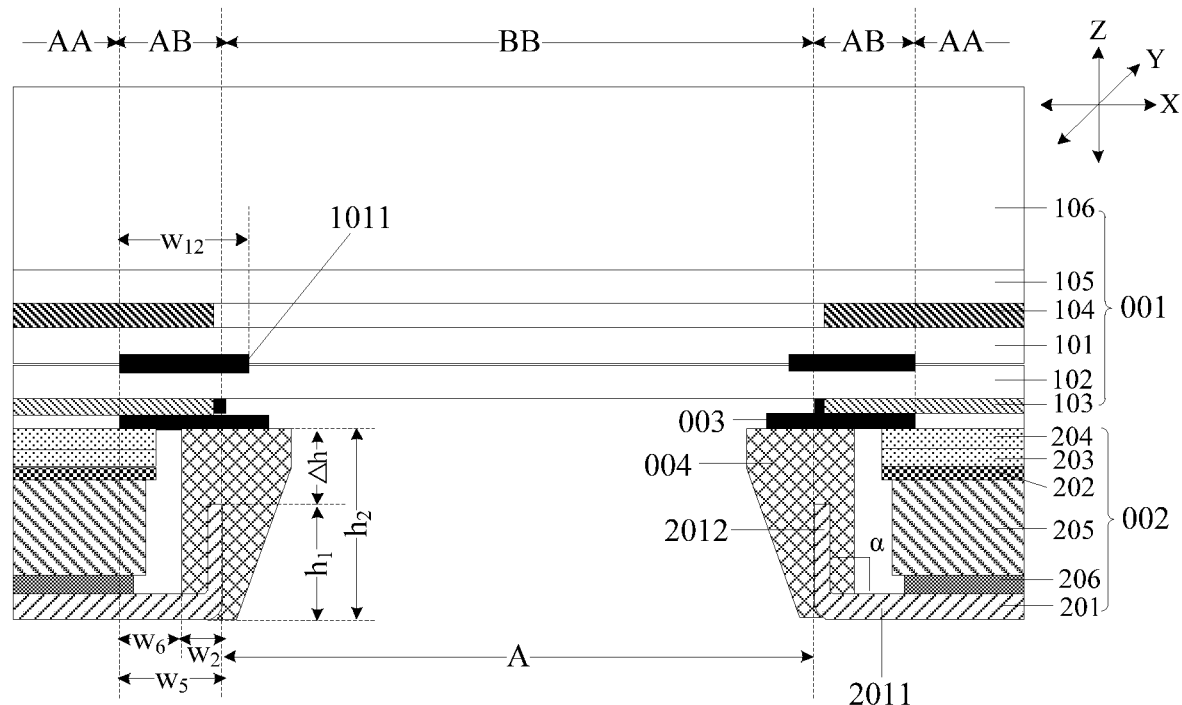
FIG. 30 is another sectional schematic diagram along the line I-I' in FIG. 2.
Figure 31:
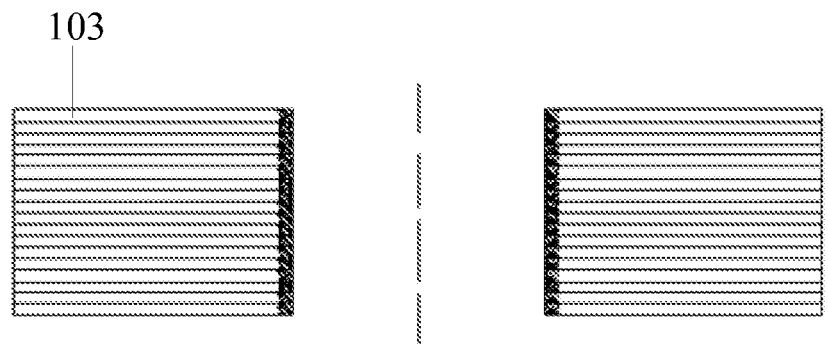
FIG. 31 is a schematic diagram of failure blackening of sidewalls of a plurality of polarizers according to an embodiment of the disclosure.
Figure 32:
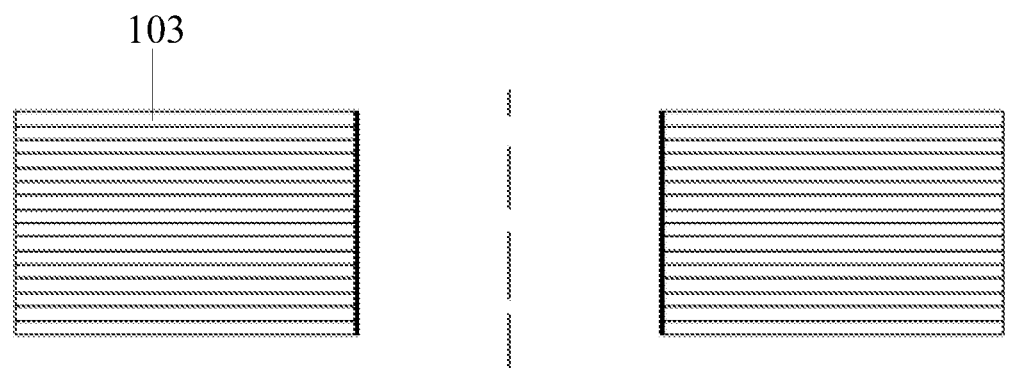
FIG. 32 is a schematic diagram of setting black coatings on sidewalls of a plurality of polarizers according to an embodiment of the disclosure.

In some embodiments, in the above-mentioned display device according to an embodiment of the disclosure, as shown in FIG. 30, a sidewall of the first polarizer 103 adjacent to the non-display area BB is blackened or has a black coating. Optionally, as shown in FIG. 31, in the scheme of failure and blackening of the sidewall of the first polarizer 103, a plurality of first polarizers 103 may be drilled at the same time, and then the chemical solution is sprayed onto the sidewalls of the first polarizers 103 surrounding the opening. The chemical solution reacts with the material of the first polarizers 103, resulting in blackening and failure of the sidewalls. The failure width may be greater than or equal to 0.01 mm and less than or equal to 2 mm, and for example, may be 0.01 mm, 0.05 mm, 1 mm, 1.5 mm, 2 mm, etc. After attaching one first polarizer 103 on the display substrate 101, the light entering the through hole A can be blocked by the failure and blackening of the sidewall of the first polarizer 103. As shown in FIG. 32, in the scheme that the sidewall of the first polarizer 103 has a black coating, not only the black coating can be directly arranged (for example, the black ink is coated) on the sidewall of the first polarizer 103 surrounding the opening after the first polarizer 103 is drilled, but also the black coating can be arranged (for example, the black ink is coated) on the sidewall of the first polarizer 103 surrounding the opening after the first polarizer 103 after being drilled is attached onto the display substrate 101, to prevent the light leakage from the sidewall through the black coating. Optionally, the thickness of the black coating is greater than or equal to 0.01 mm and less than or equal to 0.1 mm, and for example, may be 0.01 mm, 0.05 mm, 0.1 mm, etc.

Figure 33:
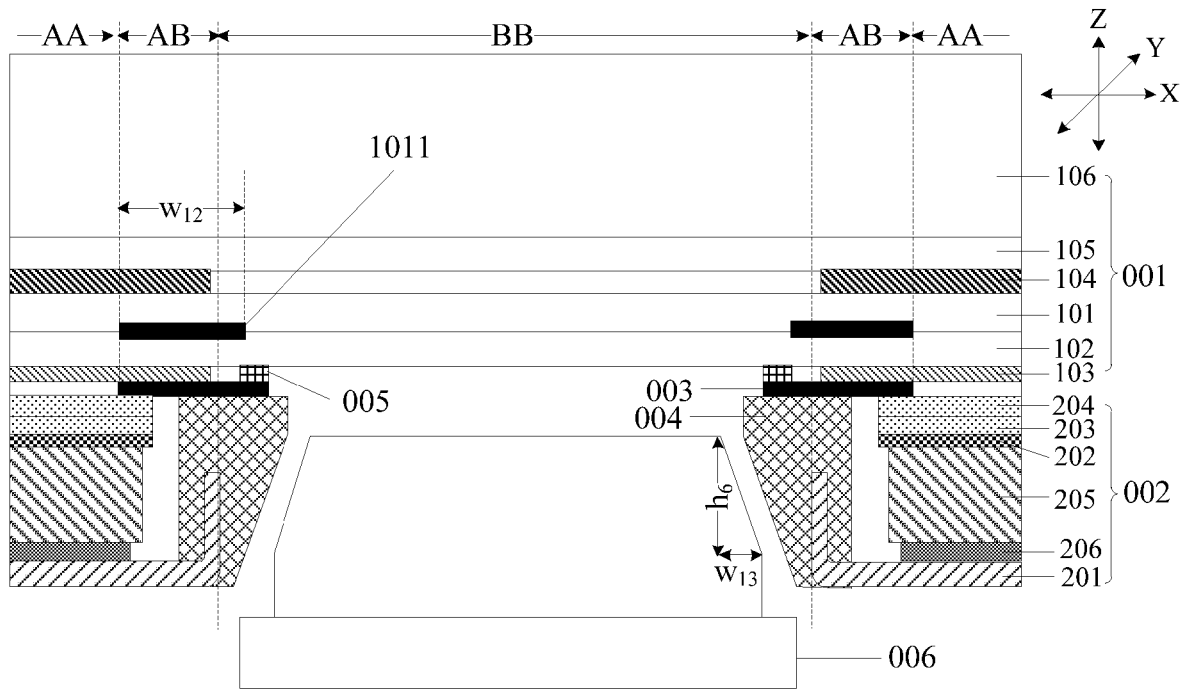
FIG. 33 is another sectional schematic diagram along the line I-I' in FIG. 2.
Figure 34:
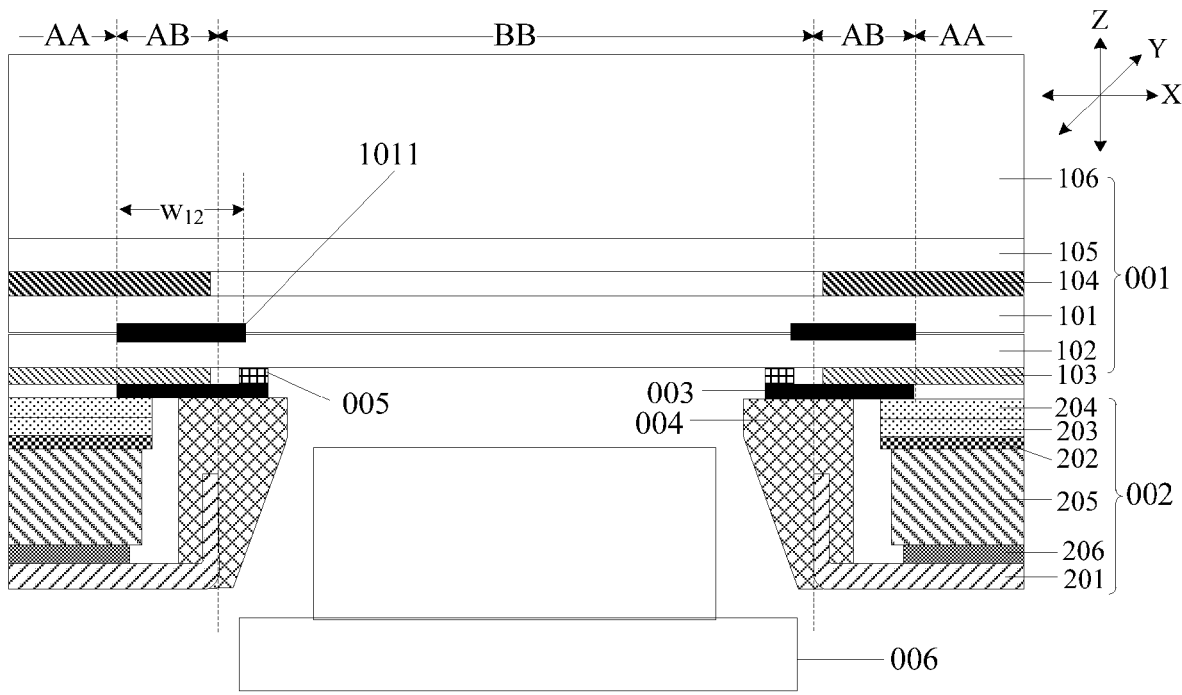
FIG. 34 is another sectional schematic diagram along the line I-I' in FIG. 2.

In some embodiments, as shown in FIG. 33 and FIG. 34, the above-mentioned display device according to an embodiment of the disclosure further includes an optical module 006 arranged at the through hole A. There is a gap between the optical module 006 and the glue frame 004 to ensure that the glue frame 004 may not block the optical module 006. Optionally, as shown in FIG. 33, in order to meet the requirement that the optical module 006 has a larger size, a terminal of the optical module 006 adjacent to the display module 001 may be provided with a chamfer, so that the chamfer is parallel to a lateral surface of the glue frame 004 adjacent to the through hole A. In some embodiments, a width $W_{13}$ of the chamfer is less than or equal to 2 mm, and for example, may be 0.5 mm, 1 mm, 1.5 mm, 2 mm, etc. A height $h_6$ of the chamfer is less than or equal to 10 mm, and for example, may be 1 mm, 5 mm, 10 mm, etc. Of course, when the size of the optical module 006 is quite different from the size of the through hole A, as shown in FIG. 34, the optical module 006 may also be provided with no chamfer, and there is only a need to ensure that the optical module 006 is not blocked by the glue frame 004.

Although the disclosure has described embodiments, it should be understood that those skilled in the art can make various modifications and variations to embodiments of the disclosure without departing from the spirit and scope of embodiments of the disclosure. Thus, the disclosure is also intended to encompass these modifications and variations to embodiments of the disclosure as long as these modifications and variations come into the scope of the claims of the disclosure and their equivalents.

What is claimed is:

1. A display device, comprising:
   a display module comprising a display area, a transition area and a non-display area, wherein the display area surrounds the non-display area, and the transition area is located between the display area and the non-display area;
   a backlight module arranged on a side of the display module away from a display side; wherein the backlight module comprises a backplane arranged on a side of the backlight module away from the display module, and a through hole located in the non-display area and used to accommodate an optical module;
   a light-shielding glue located between the display module and the backlight module, wherein an orthographic projection of the light-shielding glue on the display module overlaps with the transition area;
   a glue frame located between the light-shielding glue and the backplane, wherein an orthographic projection of the glue frame on the display module and an orthographic projection of the backplane on the display module overlap in a part of the transition area, and the orthographic projection of the glue frame on the display module and an orthographic projection of the through hole on the display module overlap at most partially;
   wherein the backplane comprises a base and a bending portion, the base is arranged parallel to the display module, the bending portion surrounds the through hole in a space between a surface on a side of the base away from the display module and a surface on a side of the display module facing the base;
   a joint cross section of the glue frame and the bending portion is a rectangle on a cross section perpendicular to a diameter of the through hole; or
   the joint cross section of the glue frame and the bending portion is approximately a right-angled trapezoid on the cross section perpendicular to the diameter of the through hole, a side of the joint cross section of the glue frame and the bending portion adjacent to the through hole extends obliquely toward the through hole, and a right angle of the right-angled trapezoid adjacent to the display module is missed to form a step; or
   the joint cross section of the glue frame and the bending portion is approximately a parallelogram on the cross section perpendicular to the diameter of the through hole.

2. The display device according to claim 1, wherein an orthographic projection of the base on the display module is arranged in the display area and the transition area, and an orthographic projection of the bending portion on the display module is at least partially arranged in the transition area.

3. The display device according to claim 2, wherein an angle between the bending portion and the base is in a range of 0° to 180°.

4. The display device according to claim 3, wherein, along a same radial position of the through hole, a distance value between terminals of the light-shielding glue and the glue frame on a same side close to the through hole is a, $0 \leq |a| \leq 0.3$ mm, and a thickness of the light-shielding glue is in a range of 0.02 mm to 0.15 mm.

5. The display device according to claim 4, wherein the display module comprises an opposing substrate comprising a light blocking structure, the light blocking structure does not overlap with the display area, and the light blocking structure surrounds the through hole;
   along the same radial position of the through hole, a terminal of the light blocking structure close to the through hole expands outward by at most 0.5 mm in a direction away from the through hole and retracts inward by at most 0.7 mm in a direction close to the through hole, with respect to a terminal of the light-shielding glue on a same side close to the through hole.

6. The display device according to claim 5, wherein the display module comprises: a display substrate opposite to the opposing substrate, and a polarizer located on a side of the display substrate away from the opposing substrate, wherein the polarizer extends from the display area to bond with a part of the light-shielding glue;
   along the same radial position of the through hole, a terminal of the polarizer close to the through hole expands outward by 0.15 mm to 1.35 mm in the direction away from the through hole, with respect to the terminal of the light blocking structure on a same side close to the through hole.

7. The display device according to claim 3, wherein the angle between the bending portion and the base is 90°;
   wherein the bending portion is arranged only in the transition area.

8. The display device according to claim 7, wherein the glue frame is arranged in the transition area and the non-display area.

9. The display device according to claim 7, wherein the glue frame is located on a side of the bending portion away from the through hole, a side of the bending portion facing the display module, and a side of the base facing the display module;
   the orthographic projection of the glue frame on the display module covers the orthographic projection of the bending portion on the display module, and overlaps with an orthographic projection of an edge of the base adjacent to the through hole on the display module.

10. The display device according to claim 8, wherein the glue frame completely wraps the bending portion, and the orthographic projection of the glue frame on the display module overlaps with an orthographic projection of an edge of the base adjacent to the through hole on the display module.

11. The display device according to claim 1, wherein an acute angle adjacent to the through hole and/or an obtuse angle adjacent to the through hole is/are replaced by a right angle/right angles in the joint cross section of the glue frame and the bending portion.

12. The display device according to claim 1, wherein a height of the bending portion is less than or equal to a height of the glue frame on a cross section perpendicular to a diameter of the through hole.

13. The display device according to claim 2, further comprising a glue-fixing hole, a part of the glue-fixing hole is located at the bending portion, and another part of the glue-fixing hole is located at a junction between the bending portion and the base.

14. The display device according to claim 1, wherein the glue frame is a black glue frame, a white glue frame, a gray glue frame or a transparent glue frame.

15. The display device according to claim 6, further comprising a light-shielding element located on a side of the polarizer adjacent to the non-display area and surrounding the non-display area.

16. The display device according to claim 15, wherein the light-shielding element is located between the light-shielding glue and the display substrate, and a thickness of the light-shielding element is roughly same as a thickness of the polarizer in a vertical direction of the display module.

17. The display device according to claim 16, wherein the light-shielding element is disposed flush with the light-shielding glue on a side adjacent to the through hole.

18. The display device according to claim 15, wherein the glue frame is a black glue frame, the light-shielding element is located on an edge of the glue frame adjacent to the through hole, and the light-shielding element is integral with the glue frame;
    wherein the light-shielding element is located between the glue frame and the display substrate, and a thickness of the light-shielding element is roughly equal to a sum of a thickness of the light-shielding glue and a thickness of the polarizer in a vertical direction of the display module.

19. The display device according to claim 18, wherein the light-shielding element is located between the glue frame and the light-shielding glue, and a thickness of the light-shielding element is roughly equal to a thickness of the polarizer in a vertical direction of the display module.

* * * * *